(12) United States Patent
Gainey et al.

(10) Patent No.: US 8,559,379 B2
(45) Date of Patent: Oct. 15, 2013

(54) METHOD AND APPARATUS FOR MITIGATING OSCILLATION BETWEEN REPEATERS

(75) Inventors: Kenneth M. Gainey, Satellite Beach, FL (US); James A. Proctor, Jr., Melbourne Beach, FL (US); Lawrence Wayne LaMont, Jr., San Diego, CA (US); James C. Otto, West Melbourne, FL (US); Carlos M. Puig, Santa Clara, CA (US); Ross L. Lintelman, Indialantic, FL (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 12/307,904

(22) PCT Filed: Sep. 21, 2007

(86) PCT No.: PCT/US2007/020485
§ 371 (c)(1),
(2), (4) Date: Apr. 21, 2009

(87) PCT Pub. No.: WO2008/036401
PCT Pub. Date: Mar. 27, 2008

(65) Prior Publication Data
US 2009/0290526 A1 Nov. 26, 2009

Related U.S. Application Data

(60) Provisional application No. 60/846,073, filed on Sep. 21, 2006.

(51) Int. Cl.
*H04W 4/00* (2009.01)
(52) U.S. Cl.
USPC ............... 370/329; 370/315; 370/401; 455/9; 455/11.1; 455/20

(58) Field of Classification Search
USPC ......... 370/279, 280, 315, 328, 329, 428, 466, 370/401, 438; 455/9, 10, 11.1, 47, 445; 375/260, 356
See application file for complete search history.

(56) References Cited

U.S. PATENT DOCUMENTS

| | | | |
|---|---|---|---|
| 3,363,250 | A | 1/1968 | Jacobson |
| 4,000,467 | A | 12/1976 | Lentz |

(Continued)

FOREIGN PATENT DOCUMENTS

| | | |
|---|---|---|
| CA | 2051283 A1 | 3/1992 |
| CN | 1137335 A | 12/1996 |

(Continued)

OTHER PUBLICATIONS

International Search Report and Written Opinion—PCT/US2007/020485, International Search Authority—European Patent Office—Mar. 19, 2008.

(Continued)

*Primary Examiner* — Andrew Lai
*Assistant Examiner* — Sumitra Ganguly
(74) *Attorney, Agent, or Firm* — Jennifer M. Pascua

(57) ABSTRACT

A first repeater operating within a wireless network including a second repeater capable of communicating with the first repeater, and first and second wireless station devices capable of communicating with at least one of the first repeater and the second repeater, includes a reception device for receiving a wireless signal at a reception frequency; a detector for detecting if a predetermined portion of the received wireless signal includes a modified portion to thereby determine that the received signal is from the second repeater; and a transmission device for transmitting the wireless signal to one of the first and second wireless station devices at a transmission frequency to thereby repeat the wireless signal.

7 Claims, 25 Drawing Sheets

(56) References Cited

U.S. PATENT DOCUMENTS

| | | |
|---|---|---|
| 4,001,691 A | 1/1977 | Gruenberg |
| 4,061,970 A | 12/1977 | Magneron |
| 4,081,752 A | 3/1978 | Sumi |
| 4,124,825 A | 11/1978 | Webb et al. |
| 4,204,016 A | 5/1980 | Chavannes |
| 4,334,323 A | 6/1982 | Moore |
| 4,368,541 A | 1/1983 | Evans |
| 4,509,206 A | 4/1985 | Carpe et al. |
| 4,679,243 A * | 7/1987 | McGeehan et al. ............. 455/47 |
| 4,701,935 A | 10/1987 | Namiki |
| 4,723,302 A | 2/1988 | Fulmer et al. |
| 4,777,653 A | 10/1988 | Bonnerot et al. |
| 4,783,843 A | 11/1988 | Leff et al. |
| 4,820,568 A | 4/1989 | Harpell et al. |
| 4,922,259 A | 5/1990 | Hall et al. |
| 5,023,930 A * | 6/1991 | Leslie .............................. 455/9 |
| 5,095,528 A | 3/1992 | Leslie et al. |
| 5,214,788 A | 5/1993 | Delaperriere et al. |
| 5,220,562 A | 6/1993 | Takada et al. |
| 5,280,480 A | 1/1994 | Pitt et al. |
| 5,333,175 A | 7/1994 | Ariyavisitakul et al. |
| 5,341,364 A | 8/1994 | Marra et al. |
| 5,349,463 A | 9/1994 | Hirohashi et al. |
| 5,368,897 A | 11/1994 | Kurihara et al. |
| 5,371,734 A | 12/1994 | Fischer |
| 5,373,503 A | 12/1994 | Chen |
| 5,383,144 A | 1/1995 | Kato |
| 5,408,197 A | 4/1995 | Miyake |
| 5,408,618 A | 4/1995 | Aho et al. |
| 5,430,726 A | 7/1995 | Moorwood et al. |
| 5,446,770 A | 8/1995 | Urabe et al. |
| 5,465,251 A | 11/1995 | Judd et al. |
| 5,471,642 A | 11/1995 | Palmer |
| 5,485,486 A | 1/1996 | Gilhousen et al. |
| 5,509,028 A | 4/1996 | Marque-Pucheu |
| 5,515,376 A | 5/1996 | Murthy et al. |
| 5,519,619 A | 5/1996 | Seda |
| 5,608,755 A | 3/1997 | Rakib |
| 5,610,916 A | 3/1997 | Kostreski et al. |
| 5,648,984 A | 7/1997 | Kroninger et al. |
| 5,654,979 A | 8/1997 | Levin et al. |
| 5,659,879 A | 8/1997 | Dupuy |
| 5,678,177 A | 10/1997 | Beasley |
| 5,678,198 A | 10/1997 | Lemson |
| 5,684,801 A | 11/1997 | Amitay et al. |
| 5,697,052 A | 12/1997 | Treatch |
| 5,726,980 A | 3/1998 | Rickard |
| 5,732,334 A | 3/1998 | Miyake |
| 5,745,846 A | 4/1998 | Myer et al. |
| 5,754,540 A | 5/1998 | Liu et al. |
| 5,764,636 A | 6/1998 | Edsall |
| 5,767,788 A | 6/1998 | Ness |
| 5,771,174 A | 6/1998 | Spinner et al. |
| 5,784,683 A | 7/1998 | Sistanizadeh et al. |
| 5,794,145 A | 8/1998 | Milam |
| 5,812,933 A | 9/1998 | Niki |
| 5,815,795 A | 9/1998 | Iwai |
| 5,825,809 A | 10/1998 | Sim |
| 5,852,629 A | 12/1998 | Iwamatsu |
| 5,857,144 A | 1/1999 | Mangum et al. |
| 5,862,207 A | 1/1999 | Aoshima |
| 5,875,179 A | 2/1999 | Tikalsky |
| 5,883,884 A | 3/1999 | Atkinson |
| 5,884,181 A | 3/1999 | Arnold et al. |
| 5,890,055 A | 3/1999 | Chu et al. |
| 5,903,553 A | 5/1999 | Sakamoto et al. |
| 5,907,794 A | 5/1999 | Lehmusto et al. |
| 5,963,846 A | 10/1999 | Kurby |
| 5,963,847 A | 10/1999 | Ito et al. |
| 5,987,304 A | 11/1999 | Latt |
| 6,005,855 A | 12/1999 | Zehavi et al. |
| 6,005,884 A | 12/1999 | Cook et al. |
| 6,014,380 A | 1/2000 | Hendel et al. |
| 6,032,194 A | 2/2000 | Gai et al. |
| 6,061,548 A | 5/2000 | Reudink |
| 6,088,570 A | 7/2000 | Komara et al. |
| 6,101,400 A | 8/2000 | Ogaz et al. |
| 6,108,364 A | 8/2000 | Weaver, Jr. et al. |
| 6,128,512 A | 10/2000 | Trompower et al. |
| 6,128,729 A | 10/2000 | Kimball et al. |
| 6,141,335 A | 10/2000 | Kuwahara et al. |
| 6,163,276 A | 12/2000 | Irving et al. |
| 6,188,694 B1 | 2/2001 | Fine et al. |
| 6,188,719 B1 | 2/2001 | Collomby |
| 6,195,051 B1 | 2/2001 | McCoy et al. |
| 6,202,114 B1 | 3/2001 | Dutt et al. |
| 6,215,982 B1 | 4/2001 | Trompower |
| 6,219,739 B1 | 4/2001 | Dutt et al. |
| 6,222,503 B1 | 4/2001 | Gietema et al. |
| 6,272,351 B1 | 8/2001 | Langston et al. |
| 6,285,863 B1 | 9/2001 | Zhang |
| 6,298,061 B1 | 10/2001 | Chin et al. |
| 6,304,563 B1 | 10/2001 | Blessent et al. |
| 6,304,575 B1 | 10/2001 | Carroll et al. |
| 6,331,792 B1 | 12/2001 | Tonietto |
| 6,339,694 B1 | 1/2002 | Komara et al. |
| 6,342,777 B1 | 1/2002 | Takahashi |
| 6,363,068 B1 | 3/2002 | Kinoshita |
| 6,370,185 B1 | 4/2002 | Schmutz et al. |
| 6,370,369 B1 | 4/2002 | Kraiem et al. |
| 6,377,612 B1 | 4/2002 | Baker |
| 6,377,640 B2 | 4/2002 | Trans |
| 6,384,765 B1 | 5/2002 | Sjostrand et al. |
| 6,385,181 B1 | 5/2002 | Tsutsui et al. |
| 6,388,995 B1 | 5/2002 | Gai et al. |
| 6,393,299 B1 | 5/2002 | Mizumoto et al. |
| 6,404,775 B1 | 6/2002 | Leslie et al. |
| 6,441,781 B1 | 8/2002 | Rog et al. |
| 6,473,131 B1 | 10/2002 | Neugebauer et al. |
| 6,480,481 B1 | 11/2002 | Park et al. |
| 6,498,804 B1 | 12/2002 | Ide et al. |
| 6,501,955 B1 | 12/2002 | Durrant et al. |
| 6,516,438 B1 | 2/2003 | Wilcoxson et al. |
| 6,535,732 B1 | 3/2003 | McIntosh et al. |
| 6,539,028 B1 | 3/2003 | Soh et al. |
| 6,539,204 B1 | 3/2003 | Marsh et al. |
| 6,549,542 B1 | 4/2003 | Dong et al. |
| 6,549,567 B1 | 4/2003 | Fullerton |
| 6,563,468 B2 | 5/2003 | Hill et al. |
| 6,574,198 B1 | 6/2003 | Petersson |
| 6,628,624 B1 | 9/2003 | Mahajan et al. |
| 6,664,932 B2 | 12/2003 | Sabet et al. |
| 6,671,502 B1 | 12/2003 | Ogawa |
| 6,684,058 B1 | 1/2004 | Karacaoglu et al. |
| 6,690,657 B1 | 2/2004 | Lau et al. |
| 6,694,125 B2 | 2/2004 | White et al. |
| 6,718,160 B2 | 4/2004 | Schmutz |
| 6,728,541 B2 | 4/2004 | Ohkura et al. |
| 6,766,113 B1 | 7/2004 | Al-Salameh et al. |
| 6,781,544 B2 | 8/2004 | Saliga et al. |
| 6,788,256 B2 | 9/2004 | Hollister |
| 6,880,103 B2 | 4/2005 | Kim et al. |
| 6,888,809 B1 | 5/2005 | Foschini et al. |
| 6,888,881 B1 | 5/2005 | Nagano |
| 6,904,266 B1 | 6/2005 | Jin et al. |
| 6,906,669 B2 | 6/2005 | Sabet et al. |
| 6,934,511 B1 | 8/2005 | Lovinggood et al. |
| 6,934,555 B2 | 8/2005 | Silva et al. |
| 6,944,139 B1 | 9/2005 | Campanella |
| 6,957,042 B2 | 10/2005 | Williams |
| 6,965,568 B1 | 11/2005 | Larsen |
| 6,983,162 B2 | 1/2006 | Garani et al. |
| 6,985,516 B1 | 1/2006 | Easton et al. |
| 6,990,313 B1 | 1/2006 | Yarkosky |
| 7,027,418 B2 | 4/2006 | Gan et al. |
| 7,027,770 B2 | 4/2006 | Judd et al. |
| 7,043,203 B2 | 5/2006 | Miquel et al. |
| 7,050,442 B1 | 5/2006 | Proctor |
| 7,050,452 B2 | 5/2006 | Sugar et al. |
| 7,058,071 B1 | 6/2006 | Myles et al. |
| 7,058,368 B2 | 6/2006 | Nicholls et al. |
| 7,065,036 B1 | 6/2006 | Ryan |
| 7,088,734 B2 | 8/2006 | Newberg et al. |
| 7,103,344 B2 | 9/2006 | Menard |

(56) References Cited

U.S. PATENT DOCUMENTS

| | | |
|---|---|---|
| 7,120,930 B2 | 10/2006 | Maufer et al. |
| 7,123,670 B2 | 10/2006 | Gilbert et al. |
| 7,123,676 B2 | 10/2006 | Gebara et al. |
| 7,132,988 B2 | 11/2006 | Yegin et al. |
| 7,133,391 B2 | 11/2006 | Belcea |
| 7,133,460 B2 | 11/2006 | Bae et al. |
| 7,139,527 B2 | 11/2006 | Tamaki et al. |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake |
| 7,230,935 B2 | 6/2007 | Proctor, Jr. et al. |
| 7,233,771 B2 | 6/2007 | Proctor, Jr. et al. |
| 7,248,645 B2 | 7/2007 | Vialle et al. |
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim |
| 7,457,587 B2 | 11/2008 | Chung |
| 7,463,200 B2 | 12/2008 | Gainey et al. |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal |
| 7,676,194 B2 | 3/2010 | Rappaport |
| 7,729,669 B2 | 6/2010 | Van Buren et al. |
| 8,023,885 B2 | 9/2011 | Proctor, Jr. et al. |
| 8,027,642 B2 | 9/2011 | Proctor, Jr. et al. |
| 8,059,727 B2 | 11/2011 | Proctor, Jr. et al. |
| 8,078,100 B2 | 12/2011 | Proctor, Jr. et al. |
| 2001/0028638 A1 | 10/2001 | Walton et al. |
| 2001/0040699 A1 | 11/2001 | Osawa et al. |
| 2001/0050580 A1 | 12/2001 | O'Toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018479 A1* | 2/2002 | Kikkawa et al. ............... 370/401 |
| 2002/0018487 A1 | 2/2002 | Chen et al. |
| 2002/0034958 A1 | 3/2002 | Oberschmidt et al. |
| 2002/0045461 A1 | 4/2002 | Bongfeldt |
| 2002/0072853 A1 | 6/2002 | Sullivan |
| 2002/0101843 A1 | 8/2002 | Sheng et al. |
| 2002/0109585 A1 | 8/2002 | Sanderson |
| 2002/0115409 A1 | 8/2002 | Khayrallah |
| 2002/0119783 A1 | 8/2002 | Bourlas et al. |
| 2002/0146026 A1* | 10/2002 | Unitt et al. .................... 370/428 |
| 2002/0155838 A1* | 10/2002 | Durrant et al. ................. 455/445 |
| 2002/0159506 A1 | 10/2002 | Alamouti et al. |
| 2003/0008669 A1 | 1/2003 | Stein et al. |
| 2003/0026363 A1 | 2/2003 | Stoter et al. |
| 2003/0063583 A1 | 4/2003 | Padovani et al. |
| 2003/0124976 A1 | 7/2003 | Tamaki et al. |
| 2003/0148736 A1 | 8/2003 | Wright et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin |
| 2004/0001464 A1 | 1/2004 | Adkins et al. |
| 2004/0029537 A1 | 2/2004 | Pugel et al. |
| 2004/0047333 A1 | 3/2004 | Han et al. |
| 2004/0047335 A1 | 3/2004 | Proctor, Jr. et al. |
| 2004/0056802 A1 | 3/2004 | Hollister |
| 2004/0121648 A1* | 6/2004 | Voros ............................ 439/535 |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0240426 A1 | 12/2004 | Wu et al. |
| 2004/0248581 A1 | 12/2004 | Seki et al. |
| 2005/0014464 A1 | 1/2005 | Larsson |
| 2005/0190822 A1 | 9/2005 | Fujii et al. |
| 2005/0201315 A1 | 9/2005 | Lakkis |
| 2005/0286448 A1 | 12/2005 | Proctor, Jr. et al. |
| 2006/0028388 A1 | 2/2006 | Schantz |
| 2006/0035643 A1 | 2/2006 | Vook et al. |
| 2006/0041680 A1 | 2/2006 | Proctor, Jr. et al. |
| 2006/0045193 A1* | 3/2006 | Stolpman et al. ............. 375/260 |
| 2006/0052066 A1 | 3/2006 | Cleveland et al. |
| 2006/0056352 A1 | 3/2006 | Proctor et al. |
| 2006/0063484 A1 | 3/2006 | Proctor, Jr. et al. |
| 2006/0063485 A1 | 3/2006 | Gainey et al. |
| 2006/0067277 A1 | 3/2006 | Thomas et al. |
| 2006/0072682 A1 | 4/2006 | Kent et al. |
| 2006/0098592 A1 | 5/2006 | Proctor, Jr. et al. |
| 2006/0203757 A1 | 9/2006 | Young et al. |
| 2006/0262026 A1 | 11/2006 | Gainey et al. |
| 2007/0025349 A1 | 2/2007 | Bajic |
| 2007/0025486 A1* | 2/2007 | Gainey et al. ................. 375/356 |
| 2007/0032192 A1 | 2/2007 | Gainey et al. |
| 2007/0121546 A1 | 5/2007 | Zuckerman et al. |
| 2007/0237181 A1 | 10/2007 | Cho et al. |
| 2007/0268846 A1 | 11/2007 | Proctor et al. |
| 2007/0286110 A1 | 12/2007 | Proctor, Jr. et al. |
| 2008/0057862 A1 | 3/2008 | Smith |
| 2008/0232438 A1 | 9/2008 | Dai et al. |
| 2008/0267156 A1 | 10/2008 | Gubeskys et al. |
| 2009/0135745 A1 | 5/2009 | Gainey et al. |
| 2009/0190684 A1 | 7/2009 | She et al. |
| 2009/0323582 A1 | 12/2009 | Proctor, Jr. et al. |
| 2010/0002620 A1 | 1/2010 | Proctor, Jr. et al. |

FOREIGN PATENT DOCUMENTS

| | | |
|---|---|---|
| CN | 1186401 | 7/1998 |
| CN | 1256032 A | 6/2000 |
| CN | 1663149 | 8/2005 |
| CN | 1706117 A | 12/2005 |
| EP | 0523687 A2 | 1/1993 |
| EP | 0709973 A1 | 5/1996 |
| EP | 0715423 | 6/1996 |
| EP | 0847146 | 6/1998 |
| EP | 0853393 A1 | 7/1998 |
| EP | 0860953 A1 | 8/1998 |
| EP | 1548526 A2 | 6/2005 |
| EP | 1615354 A2 | 1/2006 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 0563623 | 3/1993 |
| JP | 05102907 | 4/1993 |
| JP | 06013947 | 1/1994 |
| JP | 06334577 | 12/1994 |
| JP | 07030473 | 1/1995 |
| JP | 07079187 | 3/1995 |
| JP | 07079205 | 3/1995 |
| JP | 07131401 | 5/1995 |
| JP | 08097762 | 4/1996 |
| JP | 8274683 A | 10/1996 |
| JP | 08274706 | 10/1996 |
| JP | 09018484 A | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |

(56) References Cited

FOREIGN PATENT DOCUMENTS

| | | |
|---|---|---|
| JP | 10135892 | 5/1998 |
| JP | 10242932 A | 9/1998 |
| JP | 11055713 | 2/1999 |
| JP | 11127104 | 5/1999 |
| JP | 11298421 | 10/1999 |
| JP | 2000031877 | 1/2000 |
| JP | 2000502218 T | 2/2000 |
| JP | 2000082983 A | 3/2000 |
| JP | 2000509536 A | 7/2000 |
| JP | 2000236290 | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001217896 | 8/2001 |
| JP | 2001244864 A | 9/2001 |
| JP | 2001357480 A | 12/2001 |
| JP | 2002033691 | 1/2002 |
| JP | 2002111571 A | 4/2002 |
| JP | 2002223188 A | 8/2002 |
| JP | 2002271255 | 9/2002 |
| JP | 2002281042 A | 9/2002 |
| JP | 2003174394 | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2004538682 T | 12/2004 |
| JP | 2005072646 | 3/2005 |
| JP | 2005110150 | 4/2005 |
| JP | 2005191691 A | 7/2005 |
| JP | 2005236626 | 9/2005 |
| JP | 2005252692 A | 9/2005 |
| JP | 2005295499 A | 10/2005 |
| JP | 2005531202 | 10/2005 |
| JP | 2005531265 | 10/2005 |
| JP | 2006503481 | 1/2006 |
| JP | 2006505146 | 2/2006 |
| JP | 2006197488 A | 7/2006 |
| JP | 2007528147 A | 10/2007 |
| KR | 19980063664 | 10/1998 |
| KR | 1020040004261 A | 1/2004 |
| KR | 100610929 | 8/2006 |
| RU | 2120702 C1 | 10/1998 |
| RU | 2233045 C2 | 7/2004 |
| RU | 2242086 C2 | 12/2004 |
| RU | 2249916 C2 | 4/2005 |
| RU | 2264036 | 11/2005 |
| WO | WO9214339 | 8/1992 |
| WO | 9505037 A1 | 2/1995 |
| WO | WO9622636 A1 | 7/1996 |
| WO | WO9715991 | 5/1997 |
| WO | WO9734434 | 9/1997 |
| WO | WO9852365 | 11/1998 |
| WO | WO9858461 | 12/1998 |
| WO | WO9923844 | 5/1999 |
| WO | WO9959264 | 11/1999 |
| WO | WO0050971 A2 | 8/2000 |
| WO | WO0152447 | 7/2001 |
| WO | WO0176098 A2 | 10/2001 |
| WO | WO0182512 | 11/2001 |
| WO | WO0199308 | 12/2001 |
| WO | WO0208857 A2 | 1/2002 |
| WO | WO0217572 A2 | 2/2002 |
| WO | WO03013005 | 2/2003 |
| WO | WO2004001892 | 12/2003 |
| WO | WO2004001986 A2 | 12/2003 |
| WO | WO2004002014 | 12/2003 |
| WO | WO2004004365 | 1/2004 |
| WO | WO2004032362 | 4/2004 |
| WO | WO2004036789 | 4/2004 |
| WO | WO2004038958 | 5/2004 |
| WO | 04047308 | 6/2004 |
| WO | WO2004062305 | 7/2004 |
| WO | WO2004107693 A1 | 12/2004 |
| WO | 2005050918 A2 | 6/2005 |
| WO | 2005069249 A1 | 7/2005 |
| WO | WO2005069656 A1 | 7/2005 |
| WO | WO2005115022 | 12/2005 |

OTHER PUBLICATIONS

Andrisano, et al., On the Spectral Efficiency of CPM Systems over Real Channel in the Presence of Adjacent Channel and CoChannel Interference: A Comparison between Partial and Full Response Systems, IEEE Transactions on Vehicular Technology, vol. 39, No. 2, May 1990.

Anonymous: Extract from IEEE P802.16e/D7, Apr. 2005 "Draft IEEE Standard for local and metropolitan area networks; Part 16: Air interface for fixed and mobile broadband wireless access systems; Amendment for physical and medium access control layers for combined fixed and mobile operation in licensed bands," IEEE [Apr. 8, 2005] pp. 194-196, XP002545971.

Code of Federal Regulations, Title 47 Telecommunication; "Federal Communications Commission code part 15.407," Federal Communications Commission vol. 1, chapter I, part 15.407.

First Office Action issued from the Chinese Patent Office in connection with corresponding Chinese application No. 200380101286.2 (Jan. 19, 2007).

Dohler, M. et al., "Distributed PHY-Layer Mesh Networks," 14th IEEE 2003 International Symposium on Personal, Indoor and Mobile Radio Communication Proceedings, 2003. PIMRC 2003. The United States of America, IEEE, vol. 3, pp. 2543 to 2547, Sep. 7, 2003, doi: 10.1109/PIMRC.2003.1259184.

First Report issued by IP Australia on Jul. 31, 2007 in connection with the corresponding Australian application No. 2003239577.

Fujii, T. et al., "Ad-hoc Cognitive Radio Cooperated with MAC Layer," IEIC Technical Report (Institute of Electronics, Information and Communication Engineers), Japan, Institute of Electronics, Information and Communication Engineers (IEIC), May 4, 2005, vol. 105 (36), pp. 59 to 66.

IEEE 802.16e/D12, "Part 16: Air Interface for Fixed and Mobile Broadband Wireless Access Systems—Amendment for Physical and Medium Access Control Layers for Combined Fixed and Mobile Operation in Licensed Bands," IEEE, Oct. 2005.

IEEE Computer Society and the IEEE Microwave Theory and Techniques Society: "Draft IEEE Standard for Local and Metropolitan Area Networks—Part 16: Air Interface for Fixed and Mobile Broadband Wireless Access Systems; Amendment for Physical and Medium Access Control Layers for Combined Fixed and Mobile Operation in Licensed Bands," IEEE P802.16e/D12, New York, USA, Oct. 14, 2005.

IEEE, "Corrigendum to IEEE Standard for Local and Metropolitan Area Networks—Part 16: Air Interface for Fixed Broadband Wireless Access Systems," Draft Standard, Sep. 12, 2005, 288 pages, P802.16/2004/Cor1/D5, New York, New York.

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

IEEE Std 802.11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by the Institute of Electrical and Electronics Engineers, Inc., Jun. 27, 2003.

IEEE Std 802.16-2001; "Part 16: Air Interface for Fixed Broadband Wireless Access Systems," IEEE Computer Society and the IEEE Microwave Theory and Techniques Society, Published by the Institute of Electrical and Electronics Engineers, Inc., Apr. 8, 2002.

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

(56) References Cited

OTHER PUBLICATIONS

Kutlu, et al., "Performance Analysis of MAC Protocols for Wireless Control Area Network," 1996 IEEE, pp. 494-499.

Mexican Office communication dated Jul. 2, 2007 issued from Mexican Patent Office for application PA/a/2004/011588 with partial translation thereof.

Notification of the First Office Action from Chinese Patent Office dates Sep. 8, 2006 for the corresponding Chinese patent application No. 200380105267.7.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Office Action issued from the Mexican Patent Office dated Feb. 22, 2008 in connection with the corresponding Mexican Patent Application No. PA/a/2004/011588.

Office communication dated Jan. 12, 2007 issued from the European Patent Office for counterpart application No. 03734139.9-1246.

Office communication dated Oct. 19, 2006 issued from the Mexican Patent Office for counterpart application No. PA/a/2004/011588.

Official communication issued from the European Patent Office dated Aug. 7, 2007 for the corresponding European patent application No. 03759271.4-2412.

Official communication issued from the European Patent Office dated Dec. 19, 2006 for the corresponding European patent application No. 03759271.4-2412.

Second Office Action issued from the Chinese Patent Office on Jul. 20, 2007 in connection with corresponding Chinese application No. 200380101286.2.

Specifications for 2.3 GHz Band Portable Internet Service—Physical & Medium Access Control Layer, TTAS.KO-06.0082/R1, Dec. 2005.

Third Office Action issued from the Patent Office of People's Republic of China dated Jan. 4, 2008 in corresponding Chinese Patent Application No. 200380101286.2.

U.S. PTO Office Action mailed on Apr. 17, 2007 for the corresponding parent U.S. Appl. No. 11/339,838, now U.S. Patent No. 7,230,935.

U.S. PTO Office Action mailed on Jan. 24, 2007 for the corresponding parent U.S. Appl. No. 11/339,838, now U.S. Patent No. 7,230,935.

U.S. PTO Office Action mailed on Nov. 21, 2006 for the corresponding parent U.S. Appl. No. 11/339,838, now U.S. Patent No. 7,230,935.

U.S. PTO Office Action mailed on Nov. 6, 2006 for the corresponding parent U.S. Appl. No. 11/339,838, now U.S. Patent No. 7,230,935.

Zimmermann, E. et al., "On the Performance of Cooperative Diversity Protocols in Practical Wireless Systems," IEEE 58th Vehicular Technology Conference, 2003, The United States of America, IEEE, Oct. 6, 2003, vol. 4, pp. 2212 to 2216.

Supplementary European Search Report—EP07838644—Search Authority—The Hague—Nov. 4, 2011.

Nov. 11, 2004 (080607EP).

\* cited by examiner

1800

METHOD AND APPARATUS FOR MITIGATING OSCILLATION BETWEEN REPEATERS

CROSS REFERENCE TO RELATED APPLICATIONS

This application is related to and claims priority from pending U.S. Provisional Application No. 60/846,073 filed Sep. 21, 2006, and is further related to: U.S. Patent Publication No. 2006-0041680 (U.S. application Ser. No. 10/530,546) to Proctor et al., which is entitled "REDUCING LOOP EFFECTS IN A WIRELESS LOCAL AREA NETWORK REPEATER; and U.S. Patent Publication No. 2005-0286448 to Proctor (U.S. application Ser. No. 10/516,327 or International Application No. PCT/US03/16208) to Proctor et al., which is entitled "WIRELESS LOCAL AREA NETWORK REPEATER" the contents all of which are incorporated herein by reference.

TECHNICAL FIELD

The technical field relates generally to a repeater for a wireless communication network, and, more particularly, to a repeater configuration for reducing oscillations among two or more repeaters or repeater sections.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in the physical layer or data link layer as defined by the Open Systems Interconnection Basic Reference Model (OSI Model).

Repeaters are also used to satisfy the increasing need to extend the range of nodes such as access points associated with wireless networks, including but not limited to wireless local area networks (WLANs) and wireless metropolitan area networks (WMANs) described and specified in the Institute of Electrical and Electronics Engineers (IEEE) 802.11, 802.16 and 802.20 standards due to the increasing popularity of unrestrained access to broadband services by, for example, portable computing devices. The effective proliferation of wireless networks depends heavily on sustaining and increasing performance levels as user demands increase.

However, when multiple repeaters occupy the same radio frequency environment, problems, such as, oscillation between repeaters can arise. Oscillations can lead to a host of problems such as distortion, saturation, loss of synchronization, and data or information loss.

Further, the problem of "scalability" of many closely located repeaters must be addressed. For instance, when repeaters are deployed in close proximity in a multi-tenant dwelling, an effective coverage area may become so large as to cause a "flooding" of packets. While the coverage area has been greatly enhanced, there may be inefficiency due to limited capacity for a large number of users.

Therefore, there is a need for low cost and low risk solutions to such oscillation problems. Preferably, the solution will be extendible to allow for more capability than simply preventing multi-repeater oscillation.

SUMMARY

In view of the above problems, a repeater operating in a wireless network according to various embodiments mitigates oscillation so that it will substantially not repeat a signal from another repeater in the wireless network in an oscillating state. The wireless network can include a second repeater capable of communicating with the first repeater, and first and second wireless station devices such as an access point and a wireless computing device capable of communicating with at least one of the first repeater and the second repeater.

According to various embodiments, the repeater includes a reception device for receiving a wireless signal at a reception frequency; a detector for detecting if a predetermined portion of the received wireless signal includes a modified portion to thereby determine that the received signal is from the second repeater; and a transmission device for transmitting the wireless signal to one of the first and second wireless station devices at a transmission frequency to thereby repeat the wireless signal.

If the predetermined portion of the received wireless signal includes the modified portion, the transmission device can be configured to not repeat a substantial portion of the wireless signal, to transmit the wireless signal at a frequency different from the transmission frequency, or transmit the wireless signal at a power level different from an original transmission power level.

The repeater can further include a signal modification device for modifying the wireless signal. The signal modification device can be, for example, a notch processor configured to insert a notch pattern on the wireless signal to be transmitted and to detect a notch pattern inserted on a wireless signal as the modified portion.

The signal modification device can also be, for example, a bi-phase modulation device configured to modulate a phase of the predetermined portion of the wireless signal. The bi-phase modulator can modulate the predetermined portion of the wireless signal to have a unique signature recognizable by the second repeater upon receiving the modified wireless signal. A surface acoustic wave (SAW) filter can be coupled to the output of the bi-phase modulator to remove spectral splattering from the modified wireless signal. A timing circuit can also be coupled to the bi-phase modulator for controlling an amount of time during which the bi-phase modulator modulates the phase of the predetermined portion of the wireless signal.

The bi-phase modulator can includes a transfer switch coupled to an input of a linear oscillator (LO), the transfer switch switching positive and negative inputs of the LO at a predetermined frequency to modulate the phase of the predetermined portion of the wireless signal.

The repeater can further include a de-modification device such as a demodulation device for removing the modified portion from the predetermined portion of the wireless signal.

The transmission device is configured to transmit or not transmit the wireless signal if the predetermined portion of the received wireless signal includes the modified portion.

The predetermined portion of the received wireless signal can be a preamble of the wireless signal and the modified portion can be a predetermined phase variation.

The detector can further be configured to detect if the wireless signal was transmitted from one of the first and second wireless station devices by performing a qualifying detection process on the received wireless signal. The qualifying detection process can include correlating a preamble of the received wireless signal to a predetermined signal pattern or demodulating one of a predetermined information sequence, a pilot channel and a pilot carrier.

The repeater can be one of a frequency translating repeater in which the reception frequency and transmission frequency are different, and a same frequency repeater in which the reception frequency and transmission frequency are same.

The repeater can also include a processor and a memory coupled to the processor. A power adjustment routine for configuring the CPU can be stored in the memory. The processor can be configured to: generate probe packets to be transmitted to the second repeater at the transmission frequency; measure a received signal strength indication (RSSI) of a packet received in response to the probe packets; determine if a path loss defined by a difference between a power level at which the probe packets were transmitted and the measured RSSI is less than a predetermined value; and mark the transmission frequency as unavailable for use if the path loss is less than the predetermined value.

The processor can further be configured to: generate a group of packets to be transmitted to the second repeater at the transmission frequency if the path loss is not less than approximately 80 dB; determine an average RSSI for the group of packets; and if the average RSSI is less than a predetermined level, mark a current transmission power as acceptable.

The processor can further be configured to: adjust the current transmission power downward by a predetermined decibel level if the average RSSI is less not than the predetermined level; regenerate the group of packets to be transmitted to the second repeater at the transmission frequency; determine an average RSSI for the group of packets; and if the average RSSI is less than a predetermined level, mark a current transmission power as acceptable.

Additional detection capability included in the repeaters can enable detection of the preamble with the phase modulated sequence and additional communications. For instance, it may be desired that packets from some repeaters may be re-repeated, while those from other repeaters are not repeated. Another example would be that only packets with a specific signature are allowed to be repeated and all others are filtered off. Other actions may include placing packets with a unique signature on a unique repeated frequency, and as such the signature may act as an addressing function, a quality of service code, or a priority code.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION

In overview, the present disclosure concerns a repeater configuration for mitigating oscillation. The instant disclosure is provided to further explain in an enabling fashion the best modes of performing one or more embodiments of the present invention. The use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in computer instructions (software) or integrated circuits (ICs), and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 16:
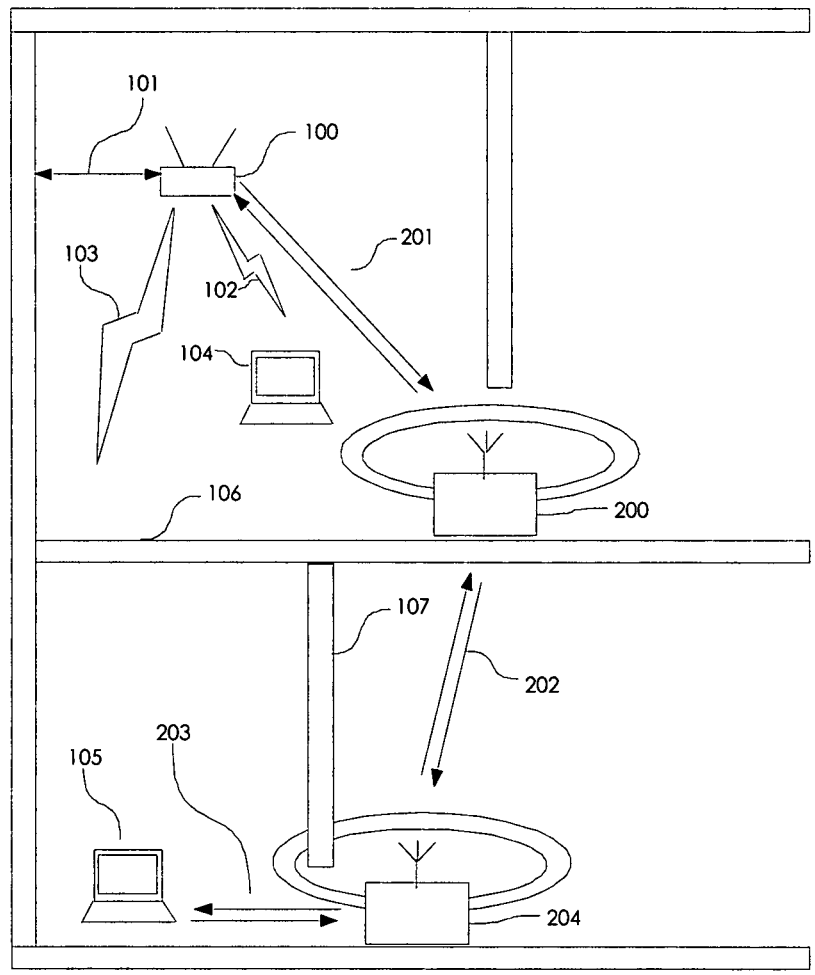
FIG. 16 is a block diagram illustrating an exemplary wireless network environment including two exemplary repeaters.

Referring now to FIG. 16, a wide area connection 101, which could be, for example, an Ethernet connection, a T1 line, a wideband wireless connection or any other electrical connection providing a data communications path, may be connected to a wireless gateway, or access point (AP) 100. The wireless gateway 100 sends RF signals, such as, for example, IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. A wireless gateway, AP, or client device will be referred to here as a wireless station. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for wireless repeaters 200, 204.

To enhance the coverage and/or communication data rate to the client unit 105, wireless repeaters 200, 204 receive packets transmitted on an initial frequency channel 201 from the wireless gateway 100, access point or another repeater. The wireless repeater 200 detects the presence of a packet on the first frequency channel 201 and receives the packet and re-transmits the packet with more power on a second frequency channel 202. Similarly, the wireless repeater 204 detects the presence of the packet on the second frequency channel 202, receives the packet and re-transmits the packet with more power on a third frequency channel 203. Unlike conventional WLAN operating protocols, the client unit 105 operates on the third frequency channel, even though the wireless gateway 100 operates on the first frequency channel 203. To perform the return packet operation, the wireless repeater 204 detects the presence of a transmitted packet on the third frequency channel 203 from the client unit 105, receives the packet on the third frequency channel 203, and re-transmits the packet on the second frequency channel 202. The wireless repeater 200 detects the presence of a transmitted packet on the second frequency channel 202 from wireless repeater 204, receives the packet on the second frequency channel 202, and re-transmits the packet on the first frequency channel 201. The wireless gateway 100 then receives the packet on the first frequency channel 201. In this way, the wireless repeaters 200, 204 are capable of simultaneously receiving and transmitting signals as well as extending the coverage and performance of the wireless gateway 100 to the client unit 105. When many units are isolated from one another, the repeaters 200, 204 can further act as a wireless bridge allowing two different groups of units to communicate where optimum RF propagation and coverage or, in many cases, any RF propagation and coverage was not previously possible.

However, as described herein above, repeater systems using frequency translation may encounter problems, for example, when beacon signals are used. Accordingly, range extension may be realized in such systems using repeaters for wireless local area networks and may be particularly advantageous when specific protocols are used, such as, for example, the 802.11 series of protocols by modifying the beacon signal to reflect the frequency translation. As noted however problems arise when adjacent nodes using or re-using translated frequencies within range of each other may establish false connections which lead to problems from node to node in terms of data traffic integrity. False connections may also lead to repeater to repeater oscillations when both repeaters are using the same frequency pairs and may further lead to system problems causing a general failure in the WLAN environment. The problems also arise on same frequency repeaters.

Wireless repeaters 200, 204 convert packets from an initial frequency channel to a different frequency channel, where it may be received by one or more clients, such as station devices (STA) or client units 104 or 105, or a different repeater. Client units 104 or 105 preferably receive a beacon identifying an 802.11b channel as being the appropriate channel for communication, and would receive information packets translated by the repeater 200, 204 from a first channel to a second channel.

Figure 17:
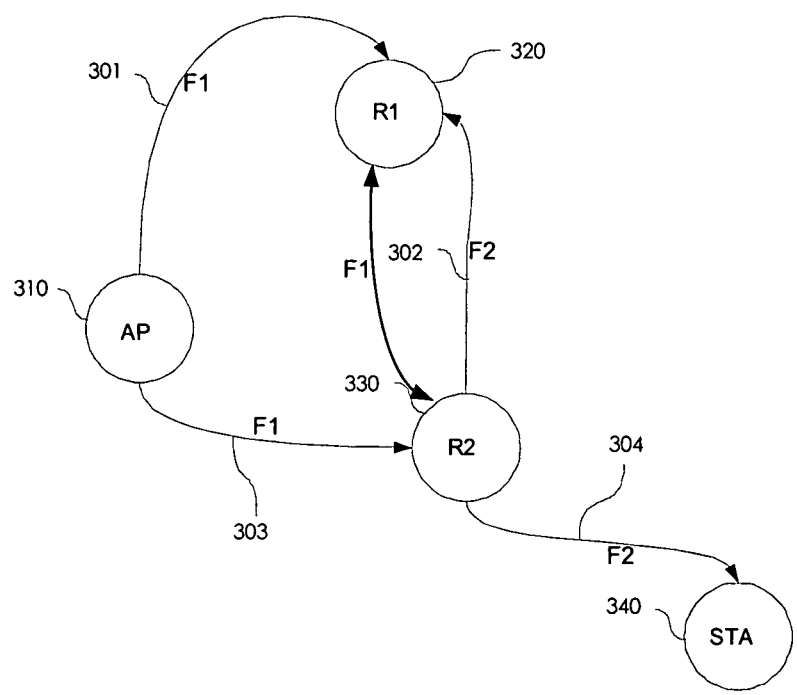
FIG. 17 is a connection diagram illustrating potential connections which may be established between exemplary repeaters, an AP and mobile communication station in a WLAN.

A problematic repeater condition may arise however, in exemplary scenario 300, as illustrated FIG. 17, wherein two repeaters R1 320 and R2 330 are configured to service one AP 310 which is within the transmit range of both repeaters via, for example, wireless connections 301 and 303. Repeaters R1 320 and R2 330 may further be capable of listening to each other's respective transmissions via a connection established over, for example, link 302. In exemplary scenario 300, the only connection established to communication unit or station device or STA 340 is connection 304 which as will be appreciated is a wireless or RF link. Problems arise when repeaters R1 320 and R2 330 are operating on the same pair of channels, such as AP and repeater channels. When AP 310 transmits, both R1 320 and R2 330 detect the transmission on, for example, a first frequency F1 and retransmit on a second frequency F2, such as the repeater channel. The primary problems arise when an isolated client station STA 340 transmits on F2 which, as describe above, is the repeater channel.

R2 330 then repeats the transmission on F1 to AP 310. R1 320 detects the transmissions from R2 330 on F1 and tries to retransmit the detected transmissions. If R1 320 happens to select F2 as the transmit frequency, a loop will be established between R1 320 and R2 330. With sufficient gain, the RF loop may oscillate, via, for example, positive feedback causing any signals destined for STA 340 over connection 304 to be jammed. It should be noted that the above RF loop does not occur if both repeaters detect the signal on the F1 because once they detect a signal on F1 they disable their receivers on F2 and then start repeating on F2.

Figure 18A:
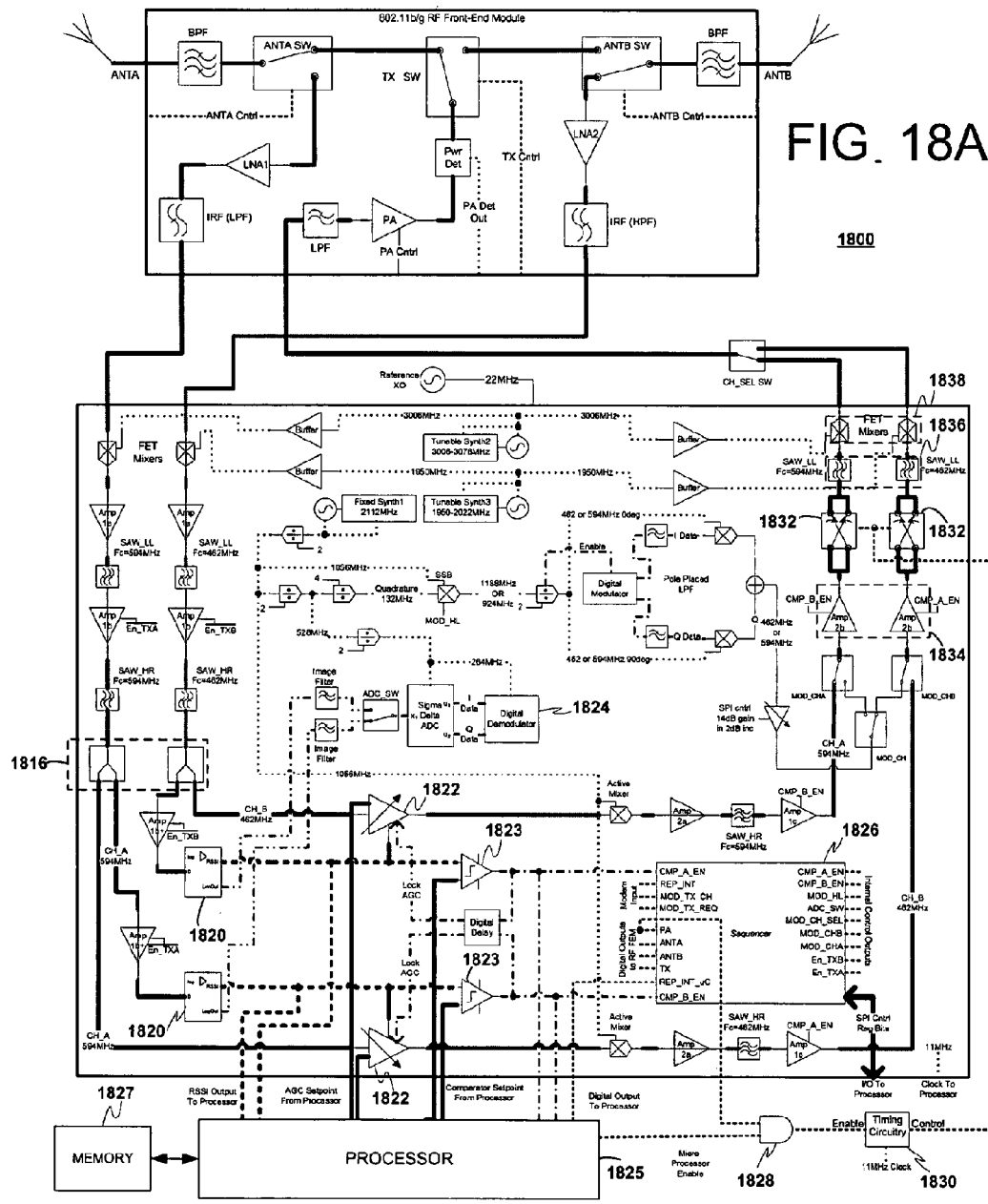
FIG. 18A is a schematic drawing illustrating an exemplary repeater in accordance with an exemplary embodiment.

Referring to FIG. 18A, a repeater 1800 for mitigating the above-described oscillation according to a first embodiment will be described. The repeater may be, for example, a frequency translating repeater as discussed above or a same-frequency repeater. The repeater 1800 includes first and second antennas (ANTA, ANT B) serving as reception and transmission devices for receiving and transmitting signals on first and second channels. A signal received via one of the first antenna ANTA or second antenna ANTB is processed by processing elements such as a low noise amplifier (LNA), image reject filter (IRF), field effect transistor (FET) mixer, surface acoustic wave (SAW) filters, amplifier, is split and propagated on two different signals paths by, for example, splitter 1816. One of the split signal paths from the splitter 1816 is preferably coupled to a logarithmic amplifier 1820 via an amplifier and the other split signal path is preferably coupled to an adjustable gain control (AGC) element 1822 for adjusting the gain of the signal. A first output of the logarithmic amplifier 1820, which is preferably a signal representative of the amplitude envelope of the received signal strength indication (RSSI), is fed to a control portion of the AGC element 1822 for adjusting the gain control, to a processor 1825 and to a comparator 1823 for comparing the RSSI level of the signal with a predetermined RSSI threshold received from the processor 1825. A second output of logarithmic amplifier 1820 is fed to a digital demodulator 1824 via various digital elements for performing direct-sequence spread spectrum (DSSS) or orthogonal frequency-division multiplexing (OFDM) detection and demodulation, and internal packet generation. The digital demodulator 1824 can perform such detection by, for example, analyzing preamble information specific to DSSS and OFDM WLAN packets generally located in the first few symbols of a packet, such as an 802.11 packet. The digital demodulator 1824 or the repeater entirely can be placed in a WLAN only configuration by, for example, the processor 1825.

Figure 19:
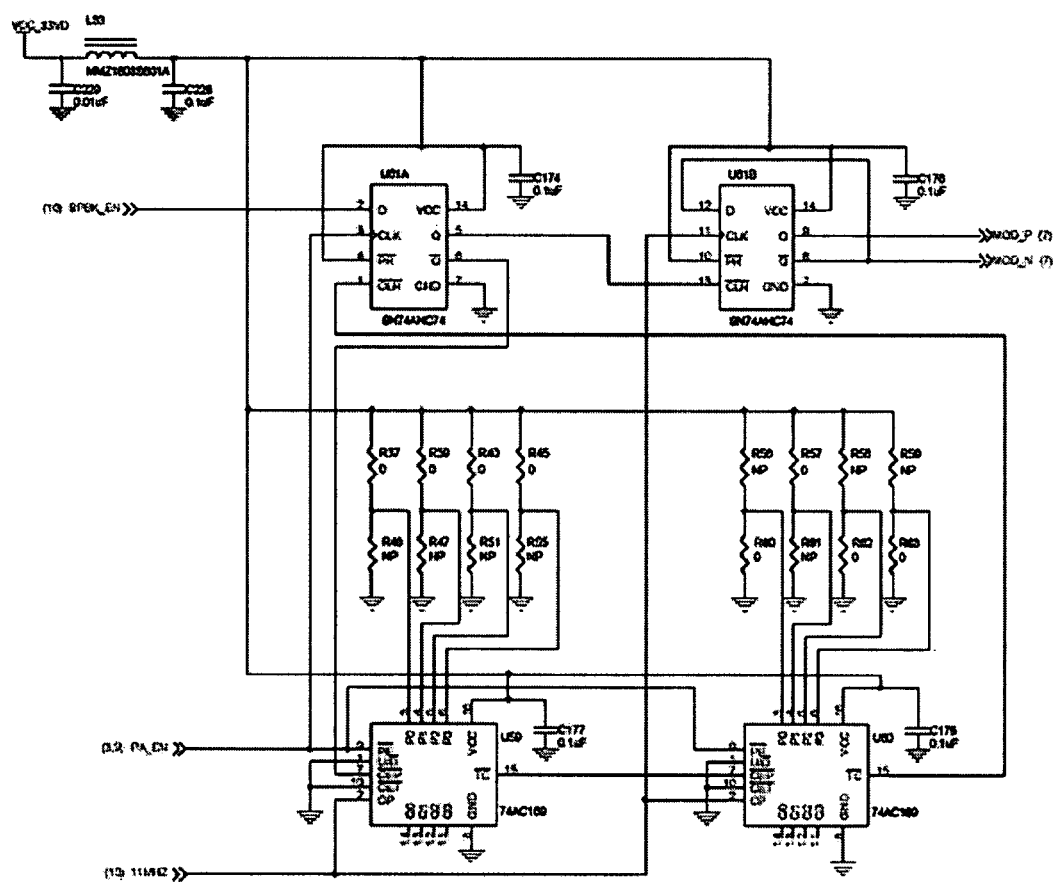
FIG. 19 is an exemplary circuit diagram of a timing circuit.

The output of the comparator 1823 is fed to a sequencer 1826 (CMP_A_EN terminal). The comparator 1823 can output a signal indicative of a detected signal when the RSSI is greater than the predetermined threshold, thus indicative of a signal to be repeated. In response to the signal from the comparator 1823, as well as other indications, the sequencer 1826 will output an enable signal (not shown) to the demodulator 1824 to begin demodulating the signal as well as various control outputs that will begin the physical repeating of the signal. Subsequently, the sequencer 1826 will also output a signal to an AND gate 1828. The AND gate 1828 also receives a microprocessor enable signal from the processor 1825, and outputs an enable signal to timing circuitry 1830 if the enable signals are received from both the sequencer 1826 and the processor 1825. The timing circuitry 1830 controls a bi-phase modulator (signal modification device) 1832, which receives the output signal from the AGC element 1822 via an amplifier 1834 and additional circuitry. An exemplary circuit for the timing circuitry 1830 is shown in FIG. 19. PA_EN represents the enable signal from the sequencer 1826, and BPSK_EN represents the enable signal from the processor 1825. 11 MHz is the clock for the timing circuitry 1830.

Figure 20:
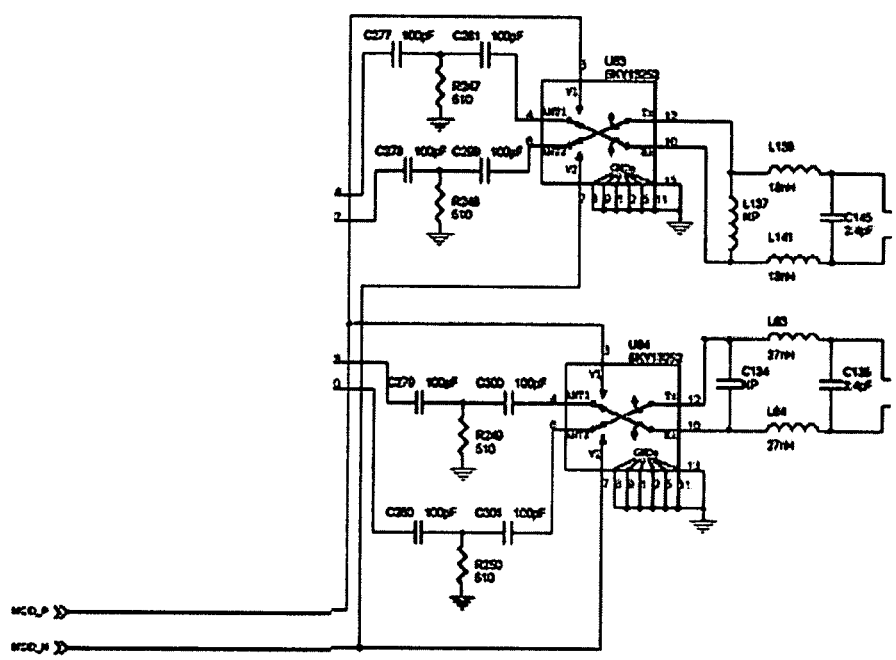
FIG. 20 is an exemplary circuit diagram of a bi-phase modulator.

The bi-phase modulator 1832 modifies the signal by adding an amount of phase variation to modulate, for example, the first few symbols of a packet to be repeated. The bi-phase modulator 1832 can include, for example, transfer switches for switching the differential signal received from the amplifier 1834 to thereby add the phase variation. An exemplary circuit for the bi-phase modulator 1832 is shown in FIG. 20. The length of time for applying the phase modulation to the repeated signal can be adjusted by the timing circuitry 1830 connected to the comparator output (see signals MOD_P and MOD_N which are from the timing circuitry 1830). The timing circuitry 1830 can be triggered by a hit on the comparator 1823. Once the timing circuitry 1830 stops, the switching of the positive and negative inputs can be stopped and normal operation can be commenced.

The output of the bi-phase modulator 1832 is fed to a SAW filter 1836 for removing any spectral splattering created by the phase modulation performed by the bi-phase modulator 1832. The signal can then be transmitted by one of the first or second antennas ANTA, ANTB via the mixer 1838 and additional analog elements to an access point, wireless station or client device (wireless station).

Figure 18B:
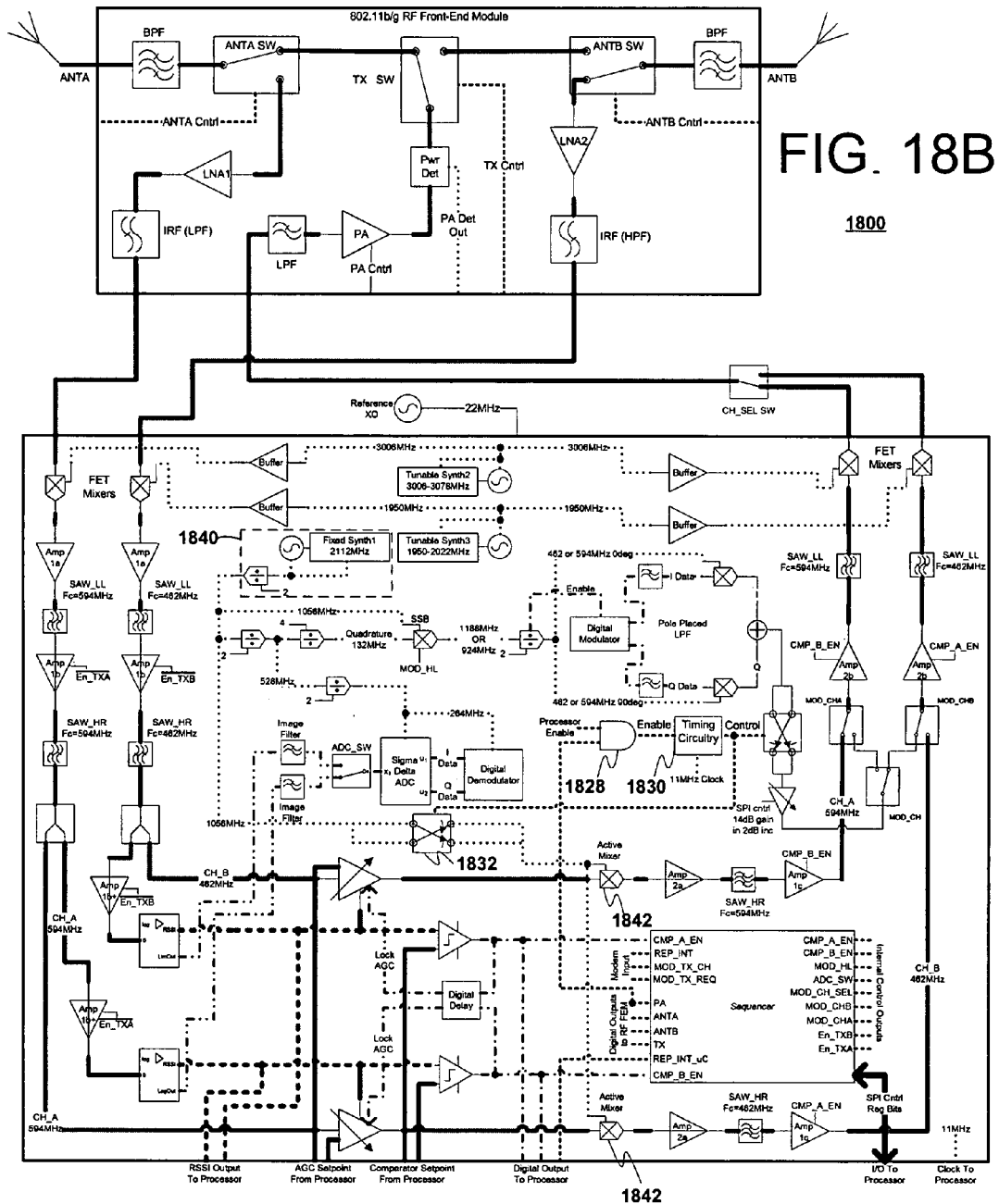
FIG. 18B is a schematic drawing illustrating an exemplary repeater in accordance with another exemplary embodiment.

Referring to FIG. 18B, in a modification to the first embodiment, the bi-phase modulator 1832 can be coupled to, for example, a 1056 MHz linear oscillator 1840 and an active mixer 1842. The length of time for applying the phase modulation to the repeated signal is still adjusted by the timing circuitry 1830. The positive and negative inputs of the 1056 MHz linear oscillator 1840 going to the active mixer 1842 can be switched back and forth at, for example, a 5.5 MHz rate. Switching the positive and negative inputs will impart the phase modulation onto the repeated signal. Once the timing circuitry 1830 stops, the switching of the positive and negative inputs can be stopped and normal operation can be commenced.

During repeater operation, when the repeater 1800 is placed in the standard operating mode of WLAN only, the digital demodulator 1824 (DSSS/OFDM detector) will not recognize packets having symbols phase modulated by another repeater as valid WLAN packets, thereby stopping the repeating process because the existing phase relationships are disrupted by the signal modification. Therefore, when the repeater 1800 receives a repeated signal from a similar repeater 1800, it will not re-repeat the signal. As a result, the problem related to oscillation as discussed above can be mitigated.

Further, the phase variation added to the signal by the bi-phase modulator 1832 is transparent to wireless stations receiving the modified signal because carrier recovery is not performed until, for example, the fifth or sixth symbol of an incoming stream.

In an alternative embodiment, an external phase modulator can advantageously be placed after the amplifier 1834. In addition, a simple timer to control the 5.5 MHz clock can be generated by dividing down an existing clock such as an 11 MHz processor clock. Further, the signal modification can be performed at the output of the mixer 1838 rather than the amplifier. However, the output of amplifier 1834 is preferably used because of the difficulty accessing the data stream coming out of the modulator in order to add the phase at base-band for signals coming out of the modulator. Accordingly, the phase modulator 1832 is triggered by either a comparator hit or anytime a modulated signal is generated. It should be noted that the signal modified may be a self-generated signal or a received signal.

Returning to the exemplary scenario 300 illustrated in FIG. 17, advantages achieved by the repeater implemented according to the various embodiments above will be discussed. Here, assuming that the repeaters R1 320 and R2 330 both include the digital demodulator 1824 and phase modulator 1832, and are both placed in a WLAN only configuration, if the repeaters R1 320 and R2 330 are operating on the same pair of channels, such as AP and repeater channels, when AP 310 transmits, both R1 320 and R2 330 detect the transmission on, for example, the first frequency F1 and retransmit on the second frequency F2. However, before transmission, the phase modulator 1832 of the repeater modifies the first few symbols of packets in the transmitted signal. When an isolated client station STA 340 transmits on F2, R2 330 then repeats the transmission on F1 to AP 310. R1 320 detects the transmissions from R2 330 on F1; however, R1 320 cannot demodulate the repeated signal because the first few symbols include the phase variation. Thus, the repeater R2 330 does not retransmit the detected transmissions back onto F2 302. Even if R1 320 happens to select F2 as the transmit frequency, a loop will not be established between R1 320 and R2 330.

A further advantage of the repeater according to the various embodiments is that limited or no additional analog, digital or I/O circuitry is needed for phase detection because such phase detection is performed by the existing circuitry for the OFDM/DSSS digital modulator. The circuitry for generating the phase modulation is extremely simple.

Accordingly, if an amount of phase variation is deliberately modulated onto the first few symbols of a repeated packet and the standard operating mode of "WLAN only" is enabled, the existing DSSS and OFDM detector will not recognize the packets associated with the phase modulated symbols as valid WLAN packets and will stop the repeating process.

The biphase modulator 1832 can be modified to perform the phase modulation of the preamble so that each packet has a unique signature. This signature may be a unique phase modulating "square wave" with a unique frequency of a set of frequencies or one of a set of orthogonal codes such as Walsh codes or the like. While it is not required that the code be orthogonal, orthogonal orientation between the codes is considered to allow for a higher performance of the detection of the one out of the set of codes with more certainty. Examples of non-orthogonal code would be ones with low cross correlations such as PN codes, Gold codes, or Barker sequences. Use of such codes as the modulation sequence by the repeater onto the preamble of the repeated packet will allow for (as previously mentioned) preventing the "wireless LAN only" detection of the signal to be prevented in a similar manner to the tests discussed below.

Further, the unique signature can be configured so that operation of a repeater receiving the modified signal is adjusted in accordance with the unique signature. For example, rather than the repeater not repeating the signal when it includes the phase modulated preamble, the repeater can be configured to take alternative actions such as transmitting the wireless signal at a frequency different from an original transmission frequency, or transmitting the wireless signal at a power level different from the original transmission power level in order to avoid oscillation. Also, the repeater could be configured to remove the unique signature from the signal. The repeater can be configured to perform such actions in accordance with the processor 1825 executing instructions stored in an associated memory.

Further, the repeater can use the phase modulation in the signal to perform a qualifying detection process to determine if the received wireless signal is from another repeater or one of the wireless stations. Particularly, the phase modulation can be correlated to predetermined signal pattern stored in the memory. If the correlation is determined to be high, then the repeater can determine that the wireless signal is from another repeater and take appropriate action to prevent oscillation. Alternatively, the qualifying detection process can include demodulating one of a predetermined information sequence, a pilot channel and a pilot carrier.

Various tests were performed on an exemplary repeater which validated the conclusions discussed above. In the tests, the search time for WLAN detection in an exemplary repeater was programmable from 4 µs to 16 µs. A digital signal was generated using a Vector Signal Generator (VSG) having phase modulation on the first 4 µs for both an OFDM signal and a DSSS signal. As discussed below, cessation of repeating was achieved 100% of the time for a programmed search time of 4 µs.

Next, the operating mode of the exemplary repeater was changed to "WLAN only" OFF. The signal successfully transited the repeater 100% of the time and a Vector Signal Analyzer (VSA) successfully demodulated the repeated signal including the phase modulation. As a control, the signal was input with the phase modulation imposed directly from the VSG and, when output to the VSA, the signal with the direct modulation was again successfully demodulated.

TIME DOMAIN OPERATION: Referring to FIGS. 1A-4B, test conditions and associated results for DSSS signals will be discussed.

Figure 1A:
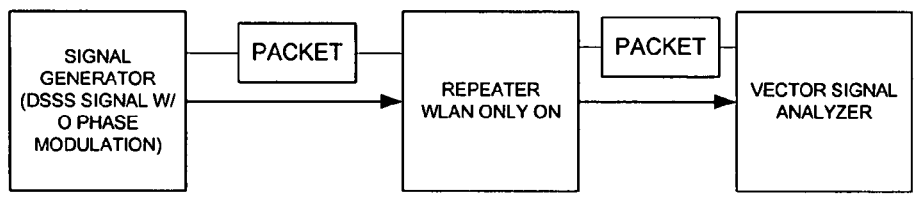
FIGS. 1A-1B are an illustration of a test configuration and a screen capture illustrating test results associated with an exemplary repeater direct sequence spread spectrum (DSSS) configuration with no phase modulation and WLAN only enabled.
Figure 1B:
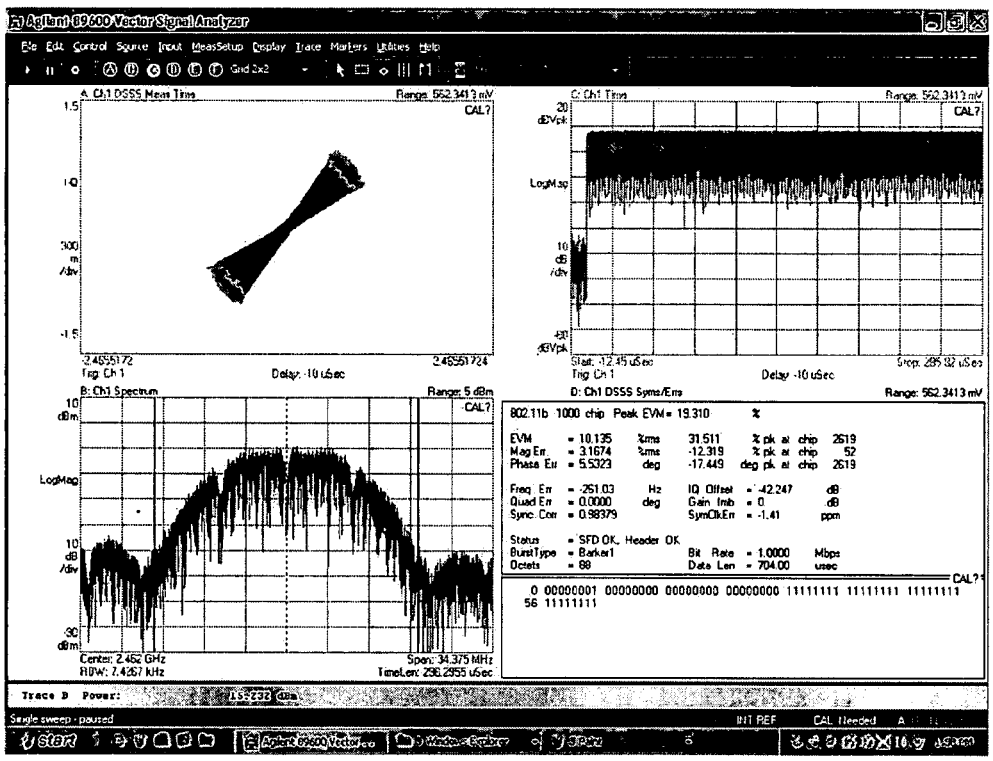

In "Test #1_DSSS," a 1 Mbps DSSS signal was injected without any phase modulation into the exemplary repeater while WLAN Only was enabled and the output was measured. As shown in FIGS. 1A-1B, the exemplary repeater fully repeated the signal and the VSA demodulator detected the Start Frame Delimiter (SFD) and Header.

Figure 2A:
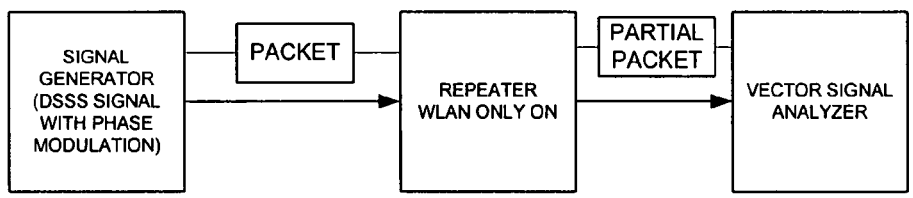
FIGS. 2A-2B are an illustration of a test configuration and a screen capture illustrating test results associated with an exemplary repeater DSSS configuration with phase modulation and WLAN only enabled.
Figure 2B:
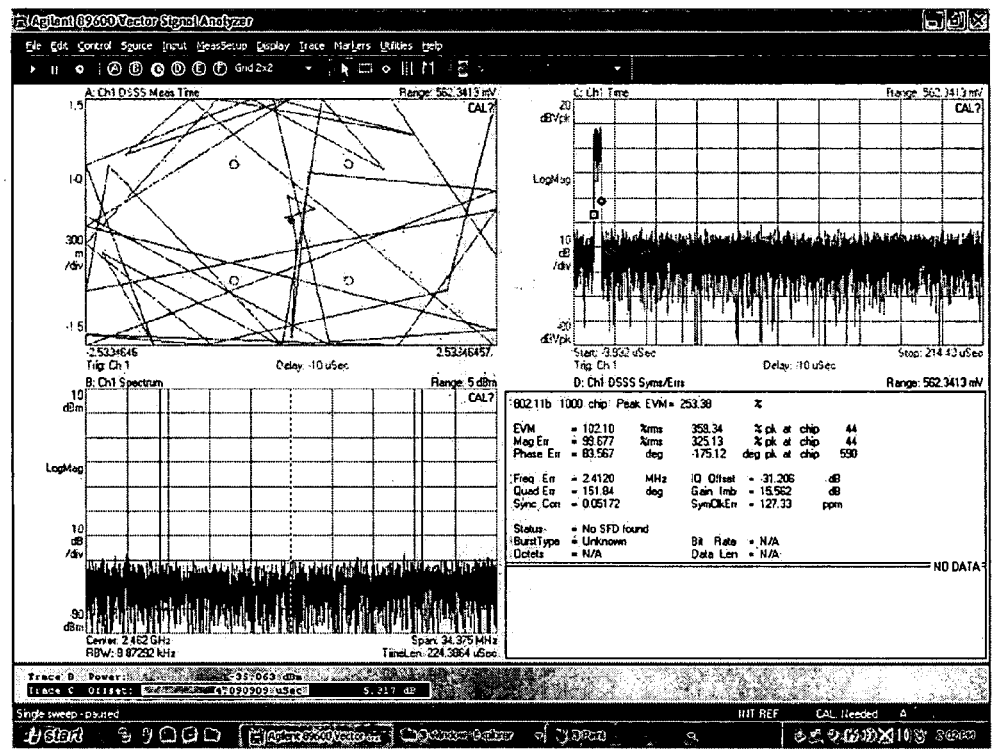

In "Test #2_DSSS," a 1 Mbps DSSS signal with Bi-Phase Modulation added to the first 4 µs of the signal was injected into the exemplary repeater while WLAN Only was enabled and the output was measured. The repeater in WLAN Only mode is set to search 4 µs for an 802.11g DSSS or OFDM packet. As shown in FIGS. 2A-2B, the exemplary repeater repeated only 4 µs (partial packet) and then stopped the transmission.

Figure 3A:
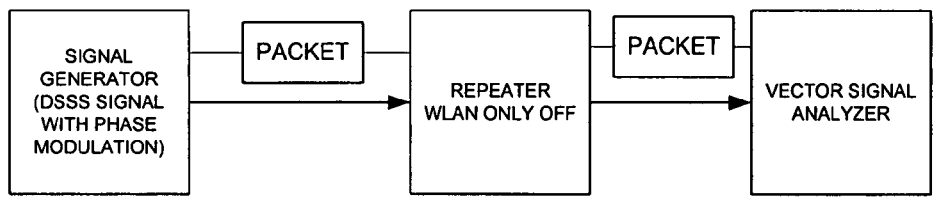
FIGS. 3A-3B are an illustration of a test configuration and a screen capture illustrating test results associated with an exemplary repeater DSSS configuration with phase modulation and WLAN only disenabled.
Figure 3B:
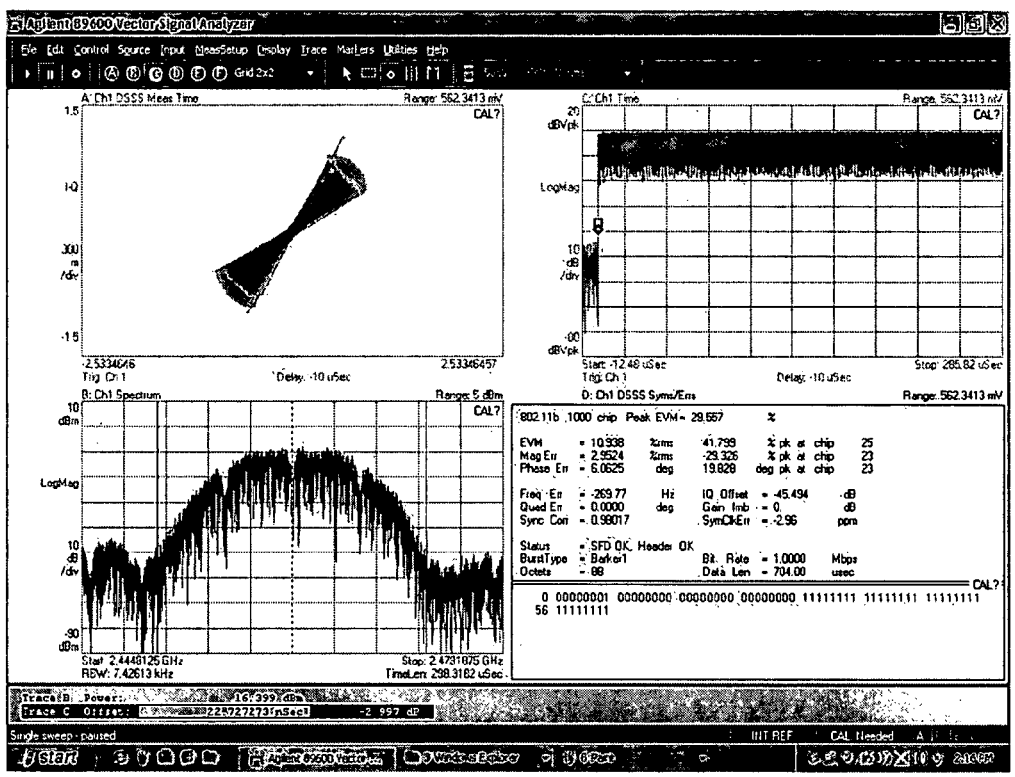

In "Test #3_DSSS," a 1 Mbps DSSS signal with Bi-Phase Modulation added to the first 4 µs of the signal was injected into the exemplary repeater while WLAN Only disabled and the output was measured. As shown in FIGS. 3A-3B, since the WLAN Only mode is disabled, the exemplary repeater repeated the entire packet since it was not searching for DSSS or OFDM preambles, and the VSA detected and demodulated the packet.

Figure 4A:
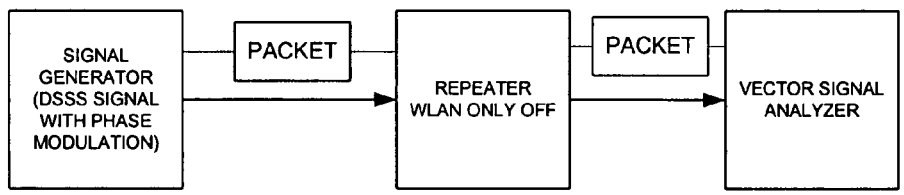
FIGS. 4A-4B are an illustration of a test configuration and a screen capture further illustrating the test results associated with an exemplary repeater DSSS configuration of FIG. 3 with phase modulation and WLAN only disenabled.
Figure 4B:
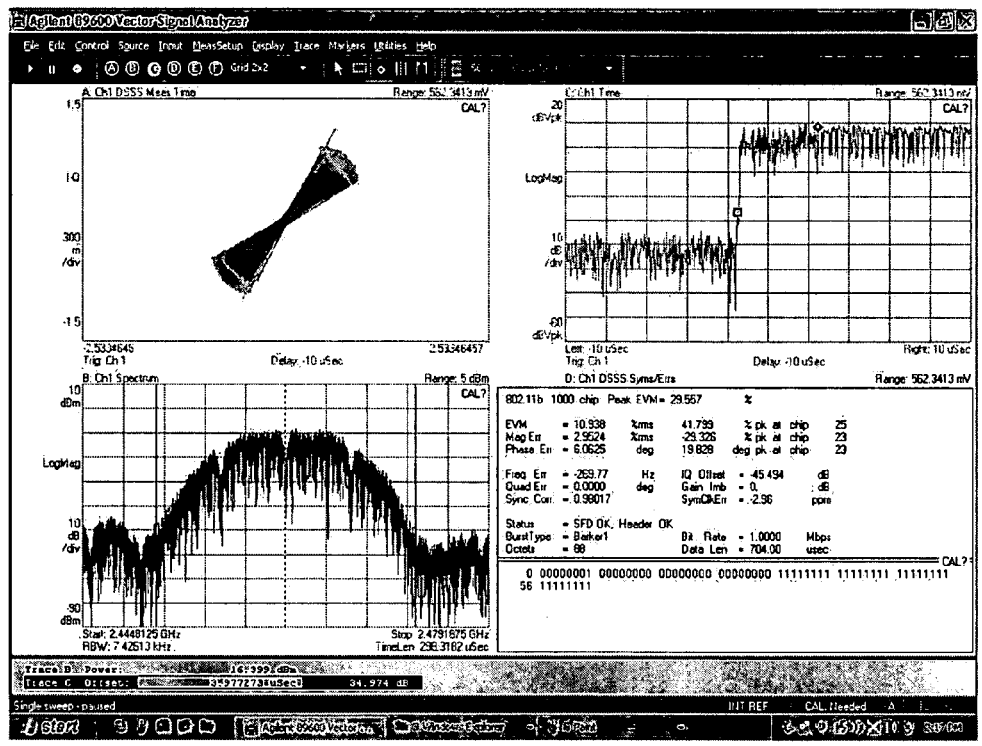

In "Test #3_DSSS Zoom" a zoomed version of Test #3_DSSS was performed in which the phase was added across the first 4 µs. As shown in FIG. 4B, the time domain signal appeared differently for the first 4 us compared to after 4 µs.

Referring to FIGS. 5A-7B, test conditions and associated results for OFDM signals will be discussed.

Figure 5A:
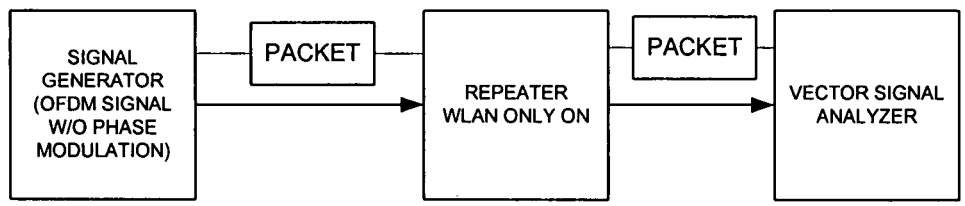
FIGS. 5A-5B are an illustration of a test configuration and a screen capture illustrating test results associated with an exemplary repeater orthogonal frequency division multiplexed (OFDM) configuration with no phase modulation and WLAN only enabled.
Figure 5B:
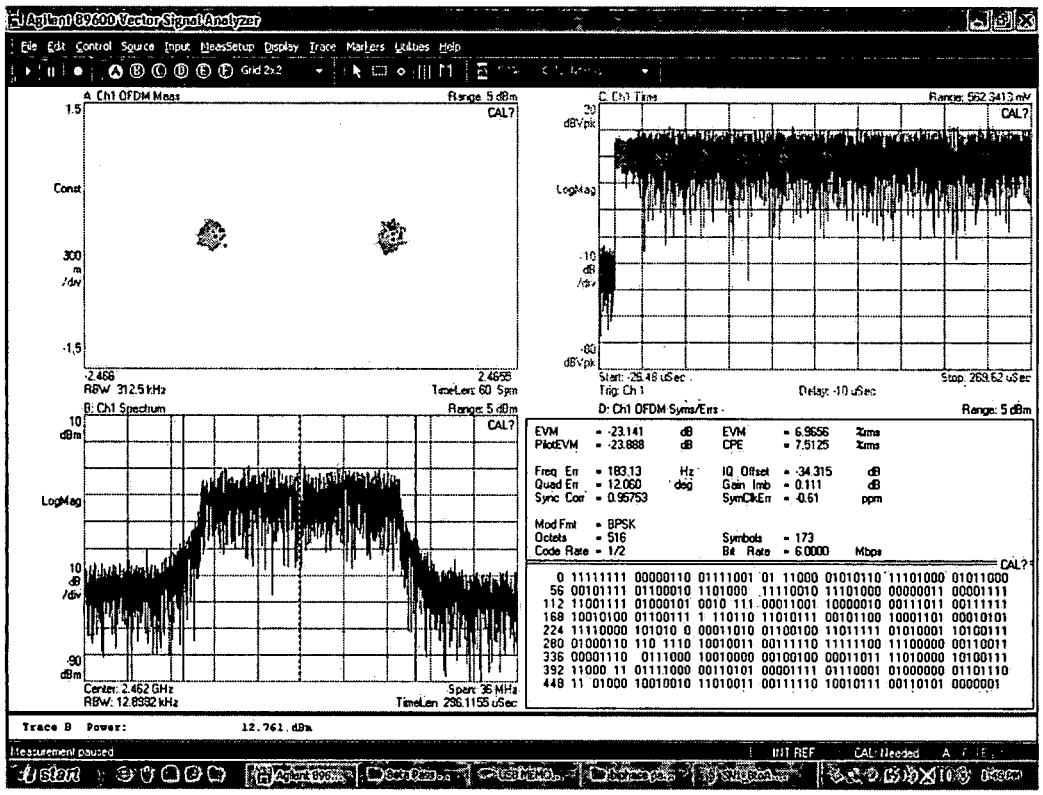

In "Test #1_OFDM," a 6 Mbps OFDM signal without any phase modulation was injected into the exemplary repeater with WLAN Only enabled and the output was measured. As shown in FIGS. 5A-5B, the exemplary repeater fully repeated the signal and the VSA demodulator detected and properly demodulated the signal.

Figure 6A:
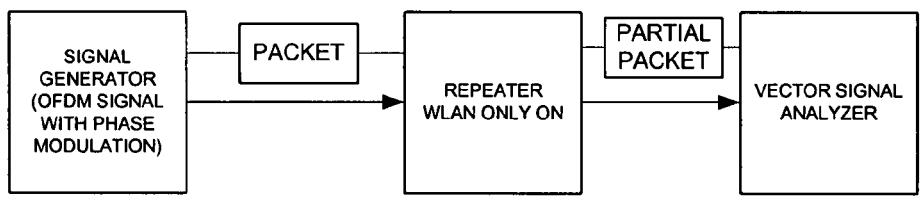
FIGS. 6A-6B are an illustration of a test configuration and a screen capture illustrating test results associated with an exemplary repeater OFDM configuration with phase modulation and WLAN only enabled.
Figure 6B:
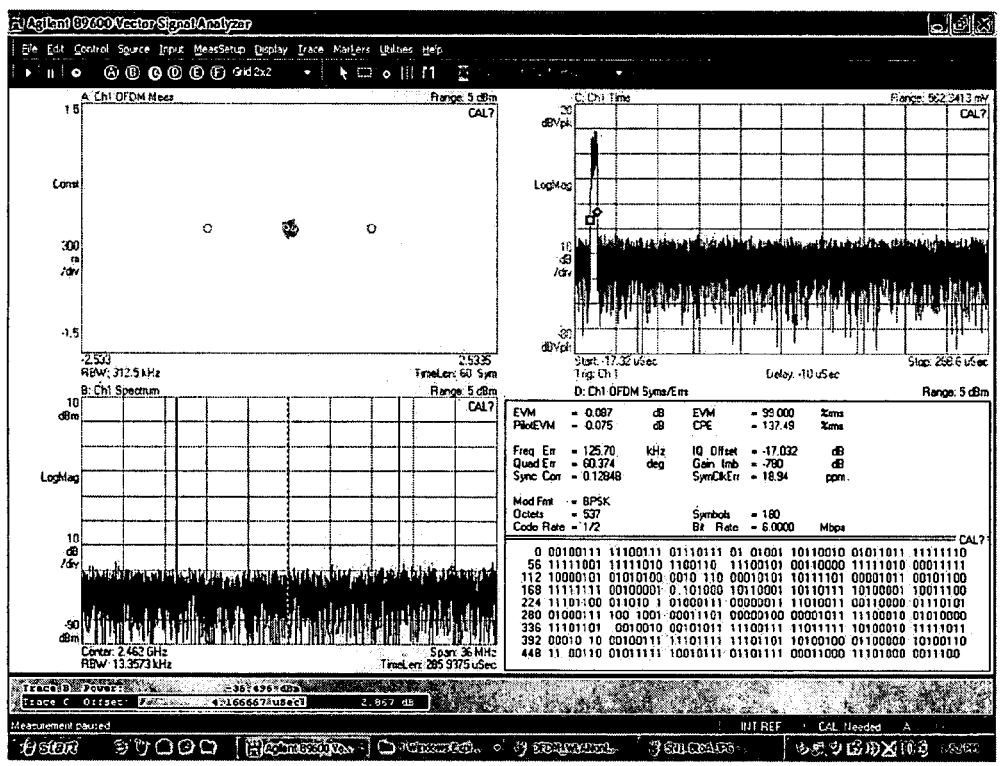

In "Test #2_OFDM," a 6 Mbps OFDM signal with Bi-Phase Modulation added to the first 4 us of the signal was injected into the exemplary repeater with WLAN Only enabled and the output was measured. Exemplary repeater WLAN Only was set to search 4 µs for an 802.11g DSSS or OFDM. As shown in FIGS. 6A-6B, the exemplary repeater repeated only 4 μs (partial packet) and then stopped the transmission.

Figure 7A:
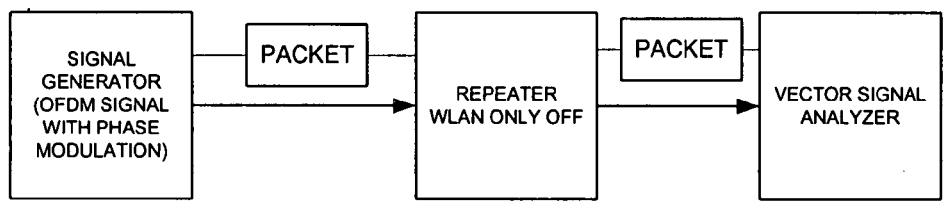
FIGS. 7A-7B are an illustration of a test configuration and a screen capture illustrating test results associated with an exemplary repeater OFDM configuration with phase modulation and WLAN only disenabled.
Figure 7B:
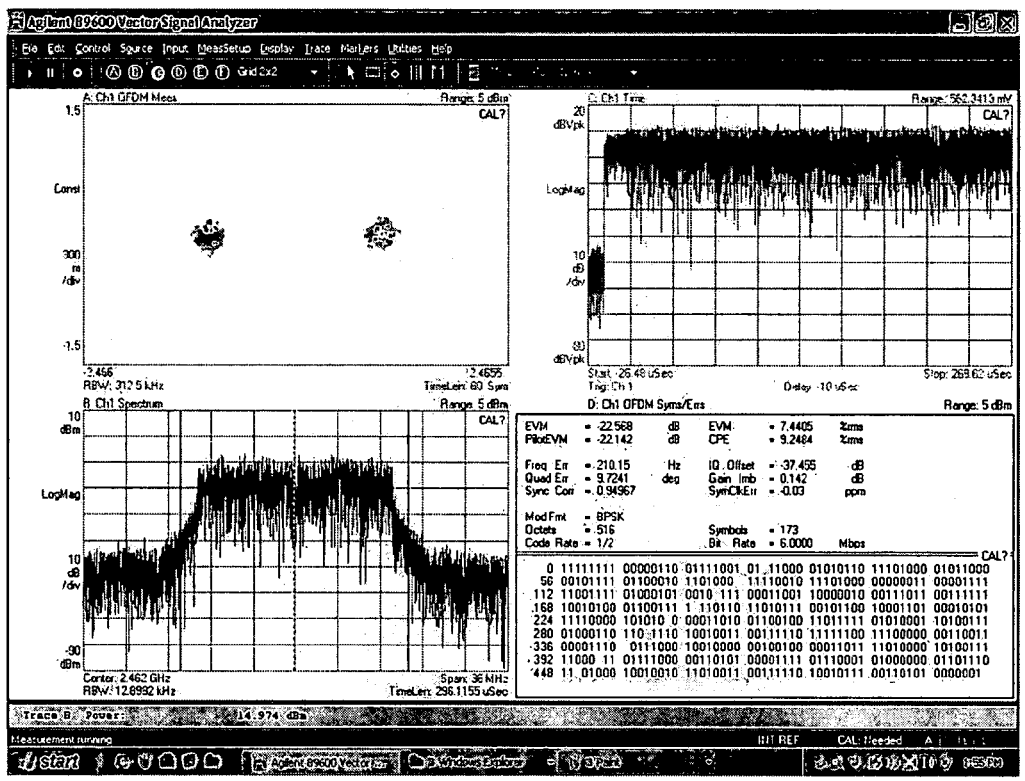

In "Test #3_OFDM," a 6 Mbps OFDM signal with Bi-Phase Modulation added to the first 4 μs of the signal was injected into the exemplary repeater with WLAN Only disabled and the output was measured. As shown in FIGS. 7A-7B, since WLAN Only is disabled the exemplary repeater repeated the entire packet since it was not searching for DSSS or OFDM preambles, and the VSA detected and demodulated the packet.

Frequency Domain Operation: Referring to FIGS. 8A-15B, spectral implications of adding the phase modulation to the signal for OFDM and DSSS and the appearance of the spectrum after being transmitted through the IF SAWs will be discussed. The test was performed at 594 MHz in order to determine if the signal could pass or be very close to the mask defined by the 802.11 standard.

Referring to FIGS. 8A-11B, test conditions and associated results for OFDM signals will be discussed.

Figure 8A:
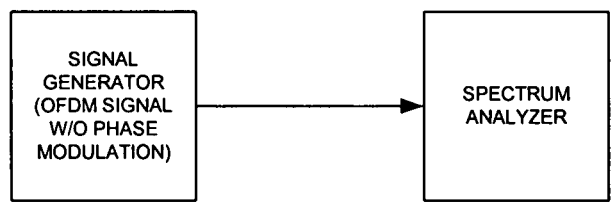
FIGS. 8A-8B are an illustration of a test configuration and a spectrum analyzer capture illustrating a signal generator output with no phase modulation.
Figure 8B:
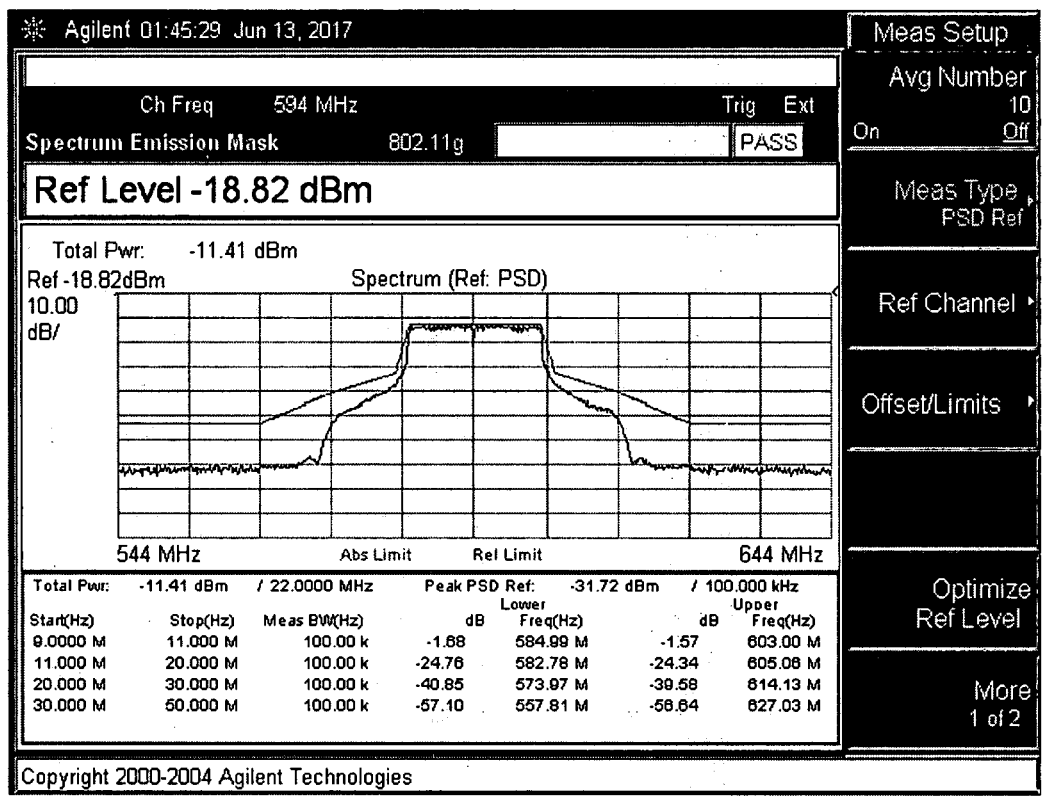

In "Test #1_OFDM" a 6 Mbps OFDM signal was injected into the spectrum analyzer without any phase modulation. As shown in FIG. 8B, the signal generated passed the 802.11g spectral masks.

Figure 9A:
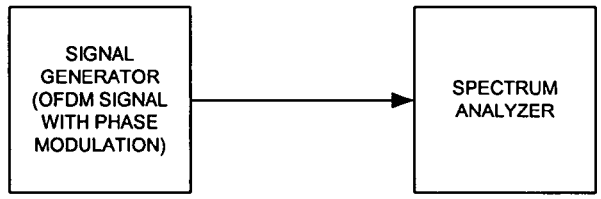
FIGS. 9A-9B are an illustration of a test configuration and a spectrum analyzer capture illustrating a signal generator OFDM output with phase modulation.
Figure 9B:
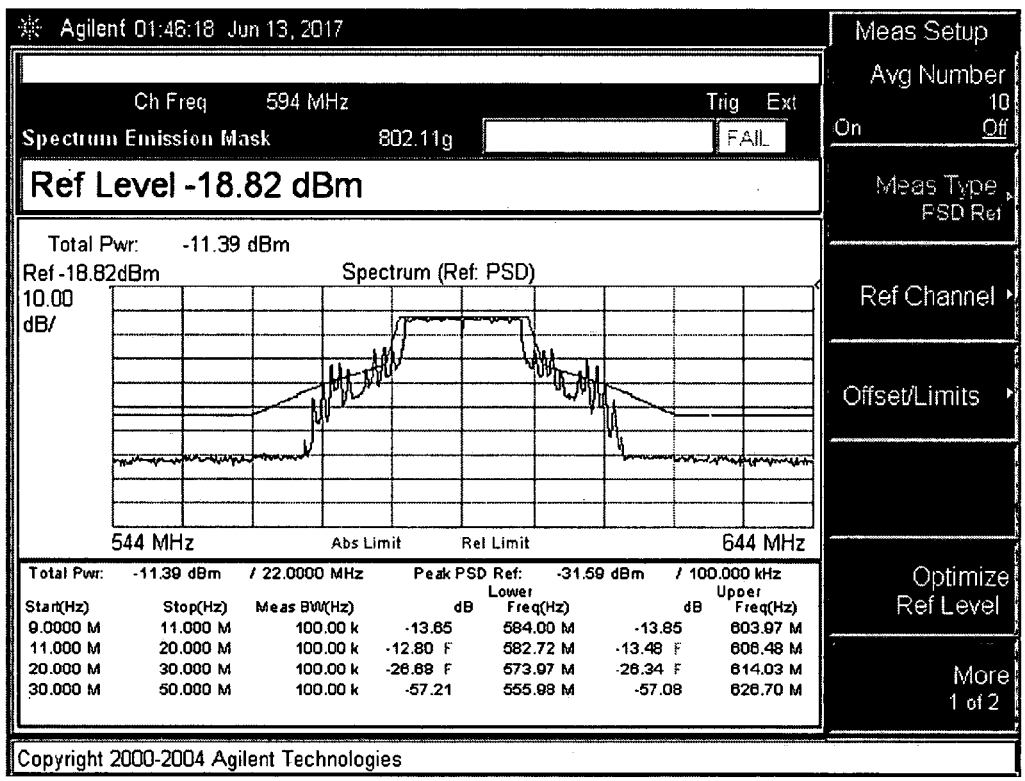

In "Test #2_OFDM" a 6 Mbps OFDM signal was injected into the spectrum analyzer with phase modulation added to the first 4 μs of the waveform. As shown in FIG. 9B, the signal generated did not pass the 802.11g spectral masks due to the phase modulation.

Figure 10A:
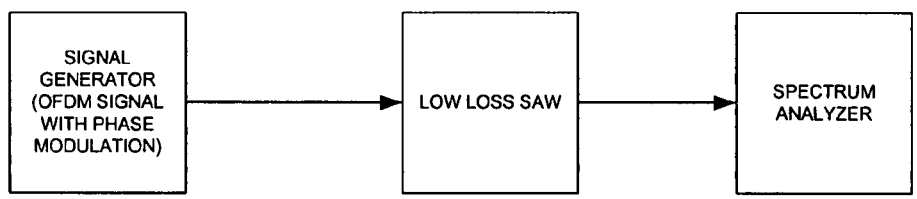
FIGS. 10A-10B are an illustration of a test configuration and a spectrum analyzer capture illustrating a signal generator OFDM output with phase modulation and low loss surface acoustic wave (SAW) filter.
Figure 10B:
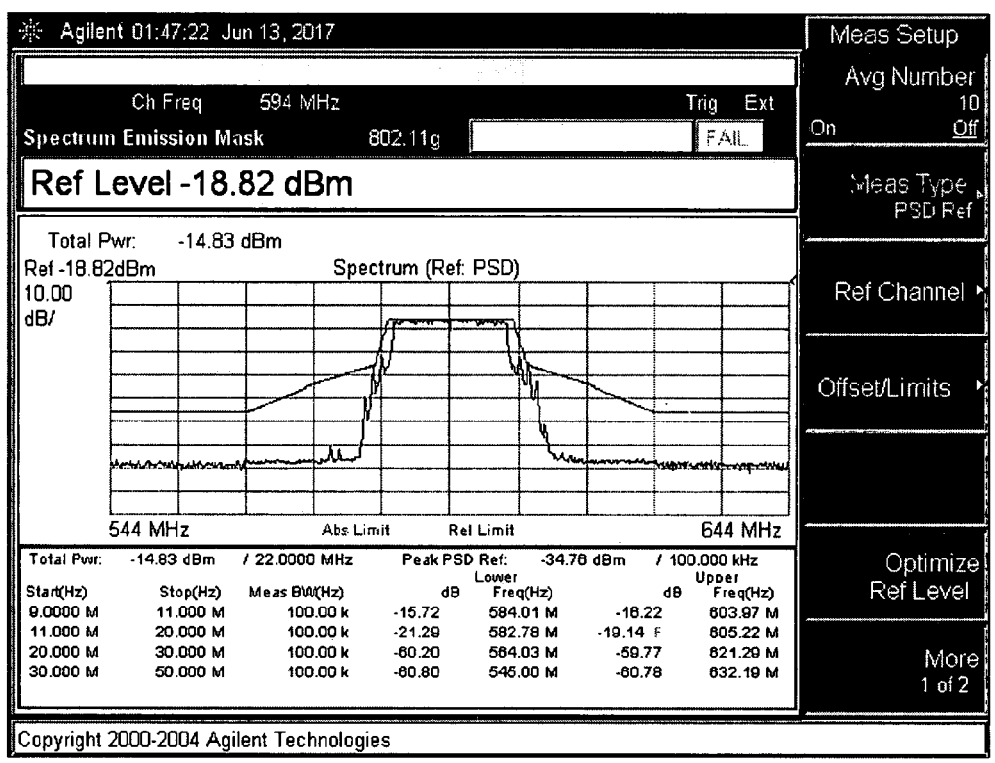

In "Test #3_OFDM" a 6 Mbps OFDM signal was injected into the 594 MHz SAW filter and then into the spectrum analyzer with phase modulation added to the first 4 μs of the waveform. As shown in FIG. 10B, although the signal was very close due to the phase modulation, it passed the 802.11g spectral masks. It should be noted that when the bi-phase modulator is implemented externally, the signal will only go through the low loss SAW filter because the bi-phase modulator would have to be added after the amplifier so that the phase modulation could also be added to the internal modulator.

Figure 11A:
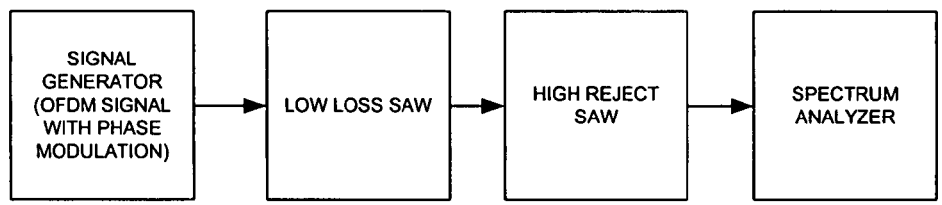
FIGS. 11A-11B are an illustration of a test configuration and a spectrum analyzer capture illustrating a signal generator OFDM output with phase modulation and low loss SAW filter and high reject SAW filter.
Figure 11B:
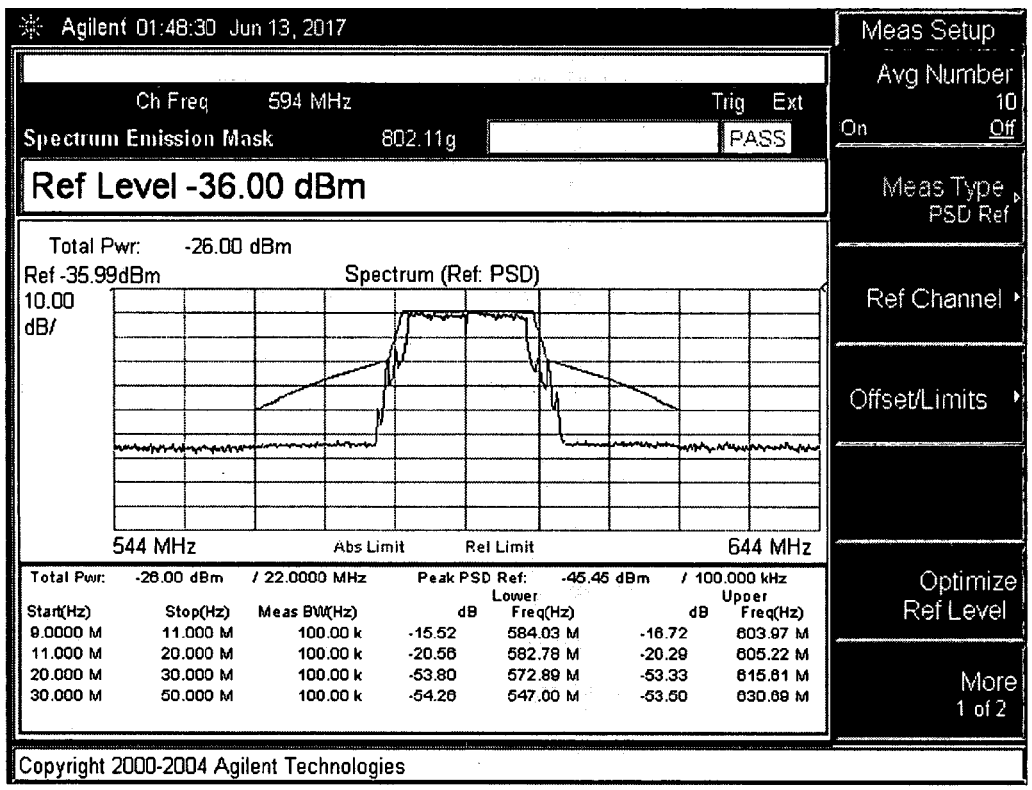
Figure 12A:
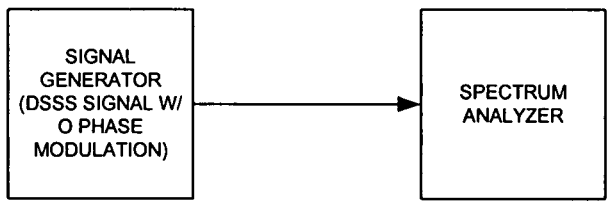
FIGS. 12A-12B are an illustration of a test configuration and a spectrum analyzer capture illustrating a signal generator DSSS output with no phase modulation.
Figure 12B:
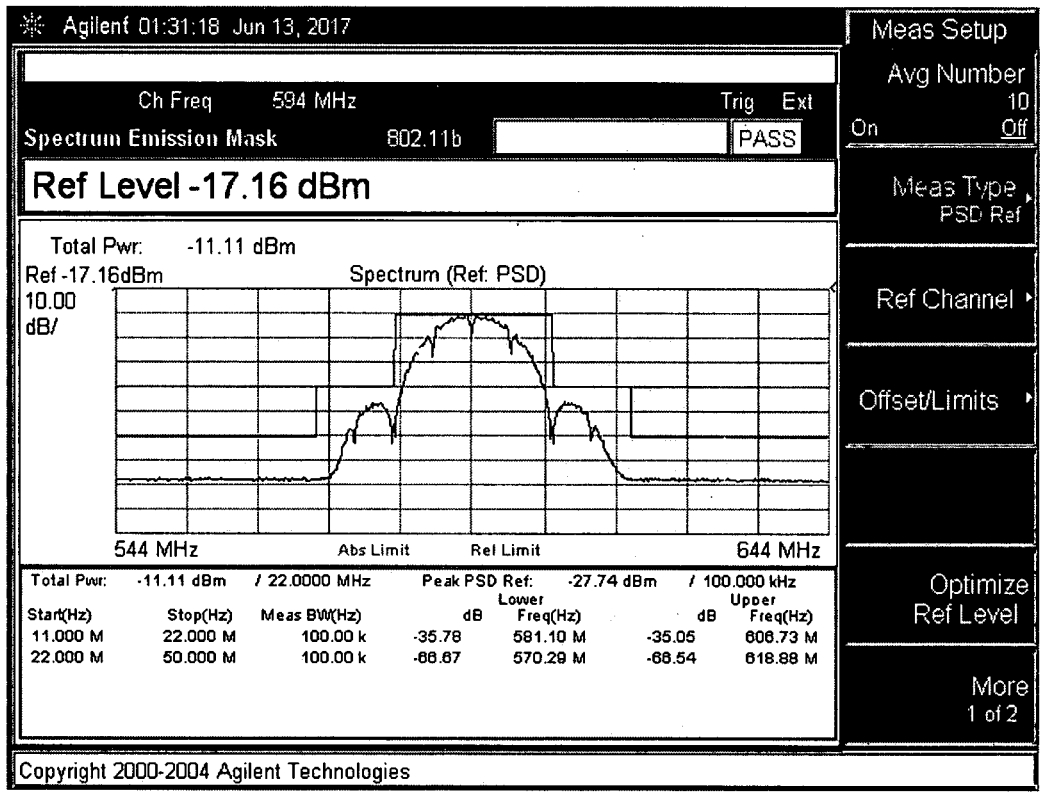

In "Test #4_OFDM" a 6 Mbps OFDM signal was injected into 594 MHz low loss and high rejection SAWs and then into the spectrum analyzer with phase modulation added to the first 4 μs of the waveform. As shown in FIG. 11B, although the signal was very close due to the phase modulation, the signal passed the 802.11g spectral masks. It should be noted that when the bi-phase modulator is implemented internally to the repeater, the signal would go through both the low loss and high rejection SAWs because the bi-phase modulation would be added to the active inter-stage mixer.

Referring to FIGS. 12A-15B, test conditions and associated results for DSSS signals will be discussed. In "Test #1_DSSS," a 1 Mbps DSSS signal was injected into the spectrum analyzer without any phase modulation. As shown in FIG. 12B, the signal generated passed the 802.11b spectral masks.

Figure 13A:
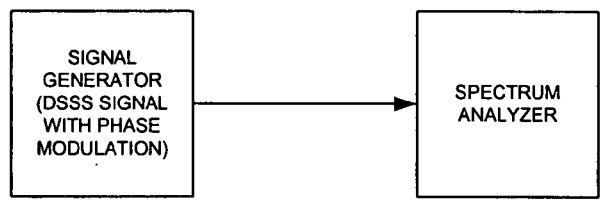
FIGS. 13A-13B are an illustration of a test configuration and a spectrum analyzer capture illustrating a signal generator DSSS output with phase modulation.
Figure 13B:
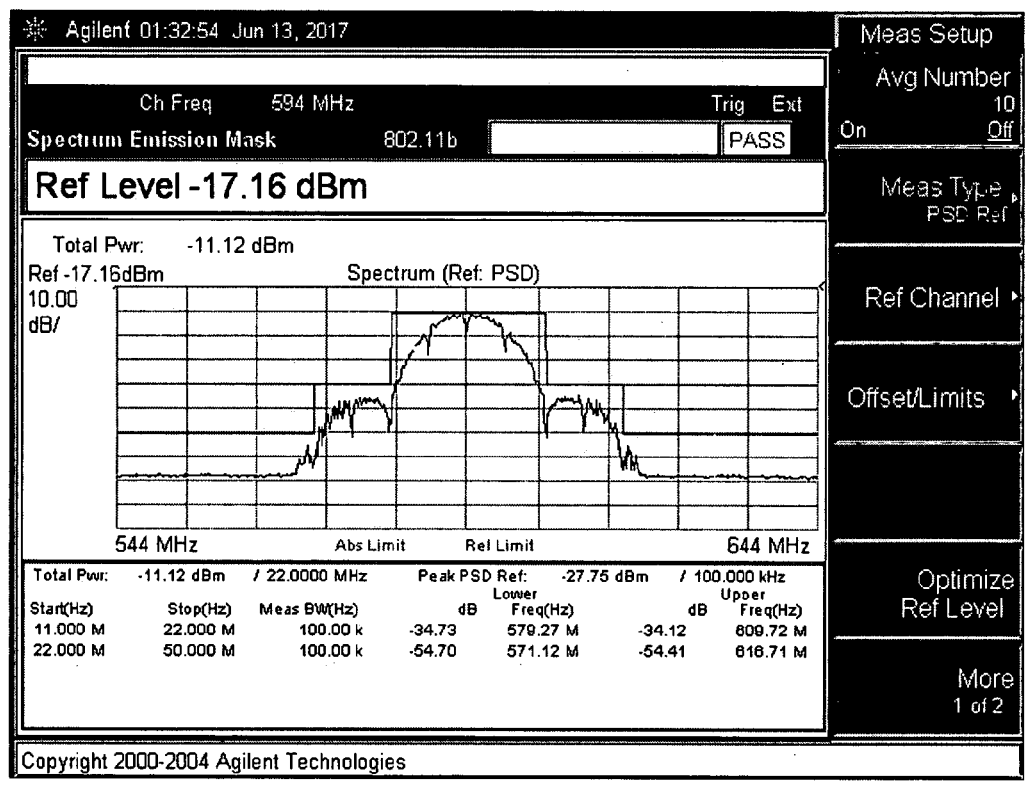

In "Test #2_DSSS," a 1 Mbps DSSS signal was injected into the spectrum analyzer with phase modulation added to the first 4 μs of the waveform. As shown in FIG. 13B, the signal no longer passed or was close to failing the 802.11b spectral masks due to the phase modulation.

Figure 14A:
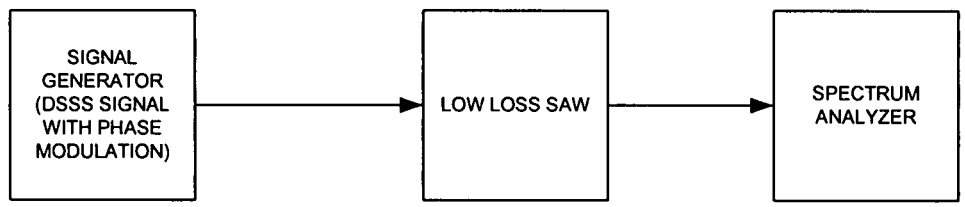
FIGS. 14A-14B are an illustration of a test configuration and a spectrum analyzer capture illustrating a signal generator DSSS output with phase modulation and a low loss SAW filter.
Figure 14B:
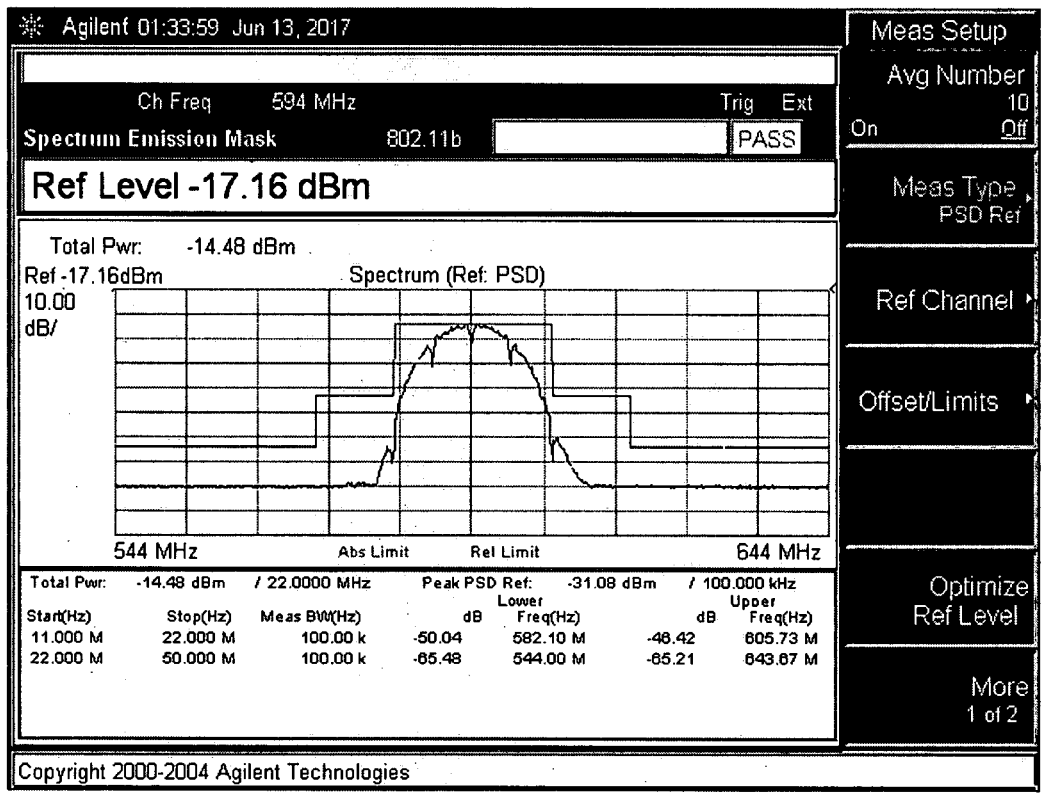

In "Test #3_DSSS," a 1 Mbps DSSS signal was injected into the 594 MHz low loss SAW and then into the spectrum analyzer with phase modulation added to the first 4 us of the waveform. As shown in FIG. 14B, although the signal was very close due to the phase modulation, the signal passed the 802.11b spectral masks.

Figure 15A:
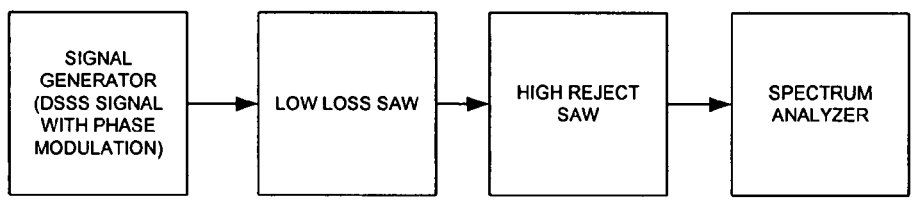
FIGS. 15A-15B are an illustration of a test configuration and a spectrum analyzer capture illustrating a signal generator DSSS output with phase modulation, a low loss SAW filter and a high reject SAW filter.
Figure 15B:
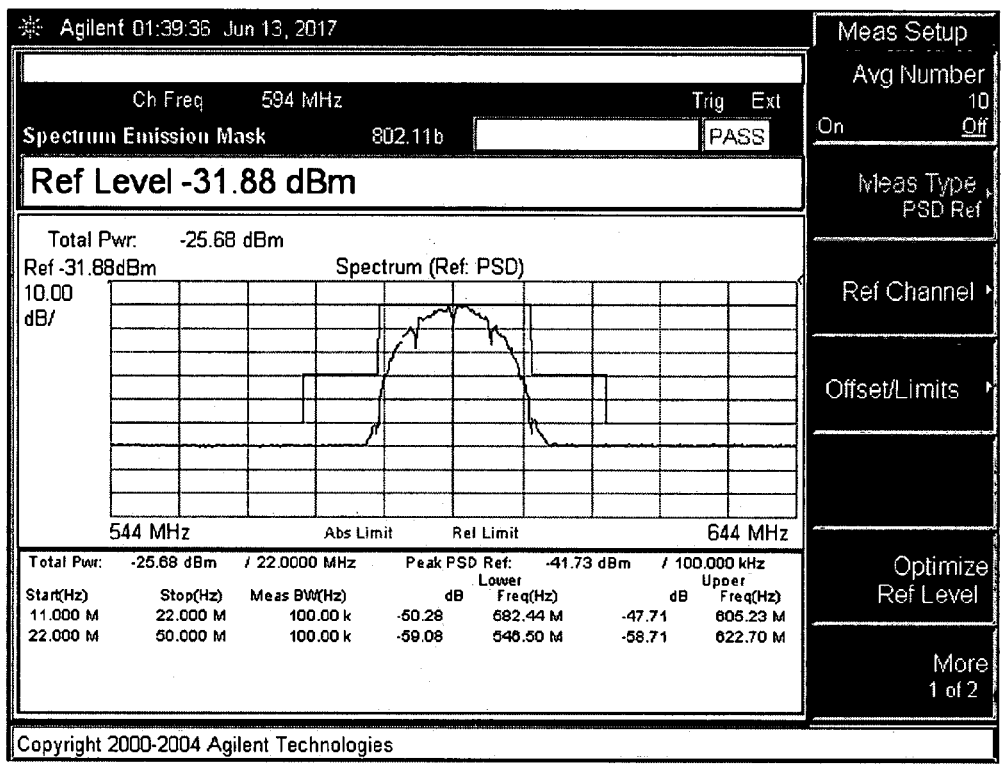

In "Test #4_DSSS," a 1 Mbps DSSS signal was injected into the 594 MHz low loss and high rejection SAWs and then into the spectrum analyzer with phase modulation added to the first 4 μs of the waveform. As shown in FIG. 15B, although the signal was very close due to the phase modulation, it passed the 802.11b spectral masks. It should be noted that when the phase modulation is performed internally the signal would go through both the low loss and high rejection SAWs because the bi-phase modulation would be added to the active inter-stage mixer.

Therefore, a repeater including the bi-phase modulation device 1832 can fully repeat a signal and not repeat a signal if a predetermined portion of the signal includes phase modulation and is in a WLAN only mode. Further, the modulated signal generated can pass through the 802.11 spectral masks when the modulated signal passes through one or more SAW filters. Here, the bi-phase modulator 1832 constitutes a signal modification device.

Figure 21:
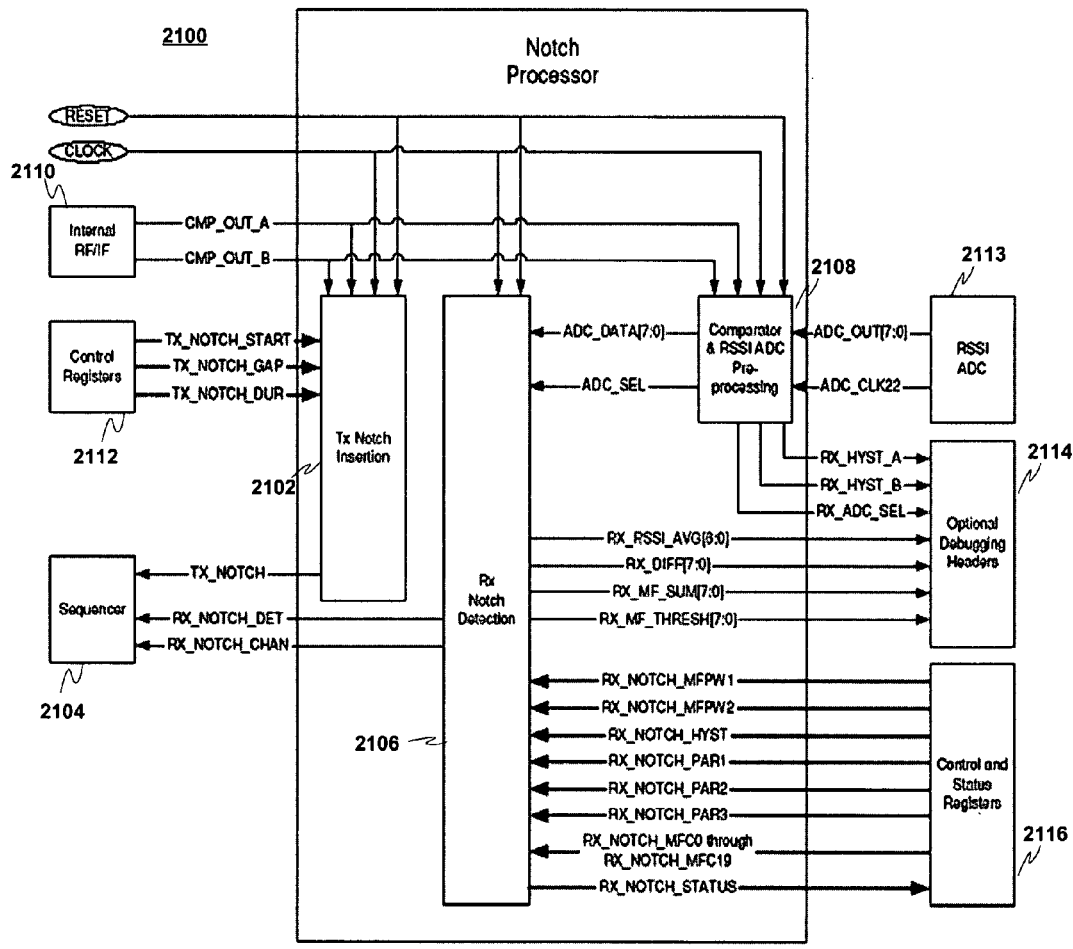
FIG. 21 is a block diagram of an exemplary notch processor.
Figure 22:
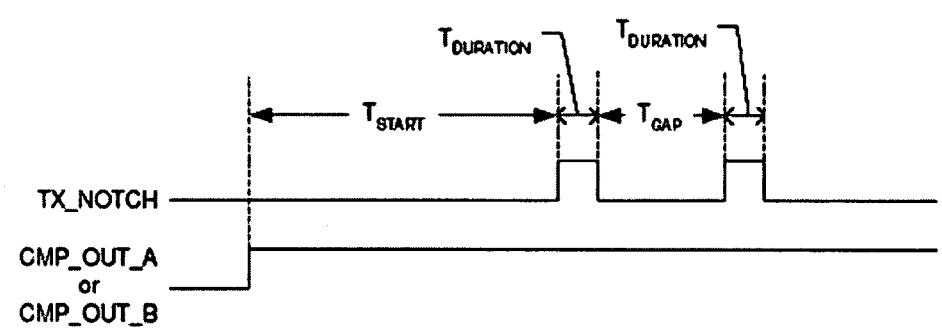
FIG. 22 is an illustration of exemplary notch insertion parameters.

Referring to FIG. 21, a repeater according to a second embodiment can include a notch processor 2100 configured to insert a notch pattern on a wireless signal to be repeated and detect if a notch pattern is present on a received wireless signal. The notch processor 2100 can be included in the repeater 1800 shown in FIGS. 18A-18B as an additional signal modification device and detection device or in place of the bi-phase modulator 1832. As shown in FIG. 22, the notch pattern is generally one or more notches starting at a specific time $T_{START}$ and separated by a gap duration $T_{DURATION}$. The start time, gap duration, and notch duration are programmable for both insertion and detection. The detection notch pattern is specified by setting the coefficients of the received notch matched filter. Further, the notch patterns can be different for transmission and reception. Returning to FIG. 21, the notch processor 2100 includes a notch insertion portion 2102 for sending a signal representative of the notch pattern (TX_NOTCH) to the sequencer 2104, a notch detection portion 2106 for sending signals representative of an indication of a detected notch (RX_NOTCH_DET) and the particular channel on which the notch was detected (RX_NOTCH_CHAN) to the sequencer 2104, a comparator portion 2108 that receives input signals (CMP_OUT_A, CMP_OUT_B) from the comparators via an internal RF interface 2110, and clock and reset signals, and control registers 2112 for sending signal representative of a notch insertion start time TX_NOTCH_START, notch insertion gap control TX_NOTCH_GAP, and duration TX_NOTCH_DUR to the notch insertion portion 2102. The comparator portion 2108 receives signals representative of the RSSI voltages for the two channels and a clock signal from an RSSI analog to digital converter (ADC) interface 2113, and outputs signals (RX_HYST_A, RX_HYST_B, and RX_ADC_SEL) to an optional debugging header portion 2114 for facilitating parameter adjustment.

The notch processor 2100 further includes control and status registers 2116 for outputting various signals representative of: matched filter peak windows (RX_NOTCH_MFPW1, RX_NOTCH_MFPW2); notch detection hysteresis control (RX_NOTCH_HYST); notch detection parameter control (RX_NOTCH_PAR1, RX_NOTCH_PAR2, RX_NOTCH_PAR3); and notch detection matched filter coefficient control (RX_NOTCH_MFC0-MFC19) to the notch detection section 2106. The notch detection section 2106 also outputs a signal representative of notch detection status (RX_NOTCH_STATUS) to the control and status registers 2116.

Figure 23:
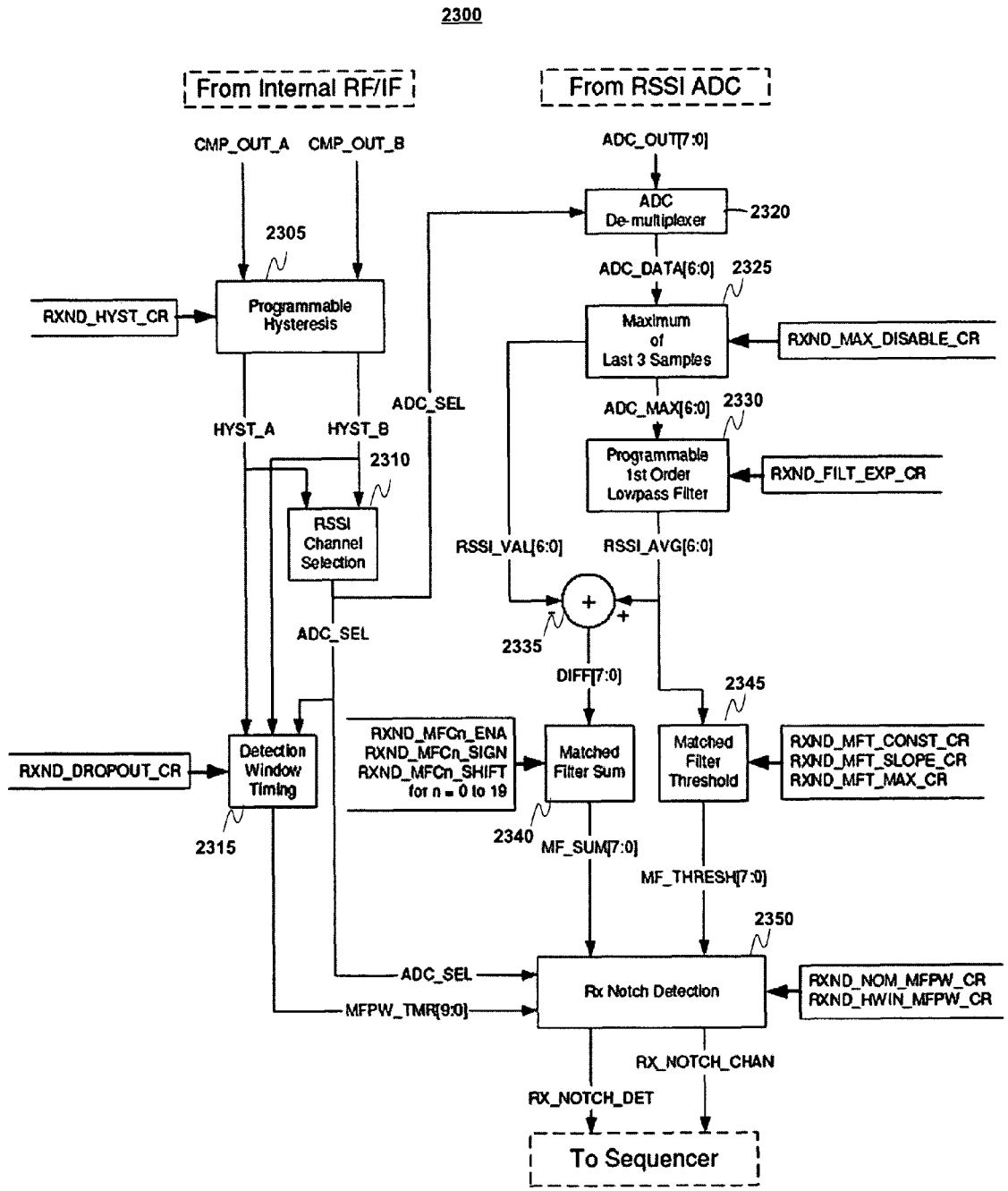
FIG. 23 is a flow diagram illustrating an exemplary notch detection signal processing.

Returning to FIG. 22, during operation, the notch processor 2100 can insert one or two short notches in the signal to be repeated after the rising edge of CMP_OUT_A or CMP_OUT_B. The sequencer 2104 applies the notch to the repeated signal whenever TX_NOTCH is 1. Exemplary notch processor operations for detecting a notch in a signal will be discussed with reference to the flow diagram shown in FIG. 23.

At 2305, programmable hysteresis is performed to generate the hysteresis-filtered comparator outputs HYST_A, HYST_B, and the ADC channel selection signal ADC_SEL based upon the analog comparator outputs CMP_OUT_A, CMP_OUT_B. The signal RXND_HYST_CR is a signal from a control register indicative of the hysteresis span for CMP_OUT_A, CMP_OUT_B.

At 2310, RSSI channel selection is performed based upon signals HYST_A, HYST_B, and a signal ADC_SEL representative of the selective channel is generated. At 2315, HYST_A, HYST_B, and ADC_SEL are used to control the signals from the timer MFPW_TMR for controlling the detection window timing. The timer control is performed based upon the number of clock cycles elapsed since the packet's start. MFPW_TMR continues counting during temporary signal dropouts shorter than RXND_DROPOUT_CR clock cycles. Such dropouts frequently occur during the notch pattern at low received signal strengths.

At 2320, ADC_SEL is used to convert the two-channel interleaved RSSI output ADC_OUT into a single-channel de-multiplexed signal ADC_DATA. At 2325, ADC_DATA is processed through a non-linear "maximum of 3" operation to generate ADC_MAX. RXND_MAX_DISABLE_CR is for disabling the use of the 3-sample maximum.

At 2330, ADC_MAX is processed through a linear first-order programmable lowpass filter, which yields a slowly-varying value RSSI_AVG that closely tracks the received signal envelope peak excursions. At 2335, a slightly delayed copy of ADC_DATA, referred to as RSSI_VAL is subtracted from RSSI_AVG to yield the (signed) difference signal DIFF, which exhibits a strong positive excursion when a notch is encountered.

At 2340, DIFF is the input to a 20-tap programmable matched filter, whose unsigned output MF_SUM is clipped to the range 0 to 255. Signal RXND_MFC[0-19]_ENA is representative of a match filter tap status, RXND_MFC[0-19]_SIGN is representative of a matched filter tap coefficient sign, and signal RXND_MFC[0-19]_SHIFT is representative of a matched filter tap coefficient magnitude.

At 2345, RSSI_AVG is used to compute a variable matched filter threshold MF_THRESH based on the values of parameter control registers RXND_MFT_CONST_CR, RXND_MFT_SLOPE_CR, and RXND_MFT_MAX_CR.

At 2350, the notch detection section sets RX_NOTCH_DET to 1 and sets RX_NOTCH_CHAN equal to ADC_SEL, whenever MF_SUM equals or exceeds MF_THRESH during a narrow time window specified by control registers RXND_NOM_MFPW_CR and RXND_H-WIN_MFPW_CR. The signals RX_NOTCH_DET and RX_NOTCH_CHAN are sent to the sequencer 2104.

Thus, a repeater including the notch processor 2100 according to the second embodiment can add a notch pattern to a repeated signal and detect a notch pattern in a received signal to mitigate the oscillation problem discussed above. Here, the notch processor 2100 constitutes a signal modification device.

According to a third embodiment, a repeater such as the repeater 1800 shown in FIGS. 18A-18B executes a power adjustment routine to stop or prevent oscillation with one or more other repeaters. The routine can begin when the repeater 1800 enters a discovery mode upon determining that another repeater within the wireless network is operating in the same frequency channel as disclosed in, for example, U.S. Patent Publication No. 2006-0041680. The repeater 1800 can be configured to execute the routine by the processor 1825 executing instructions stored in the memory 1827.

Figure 24:
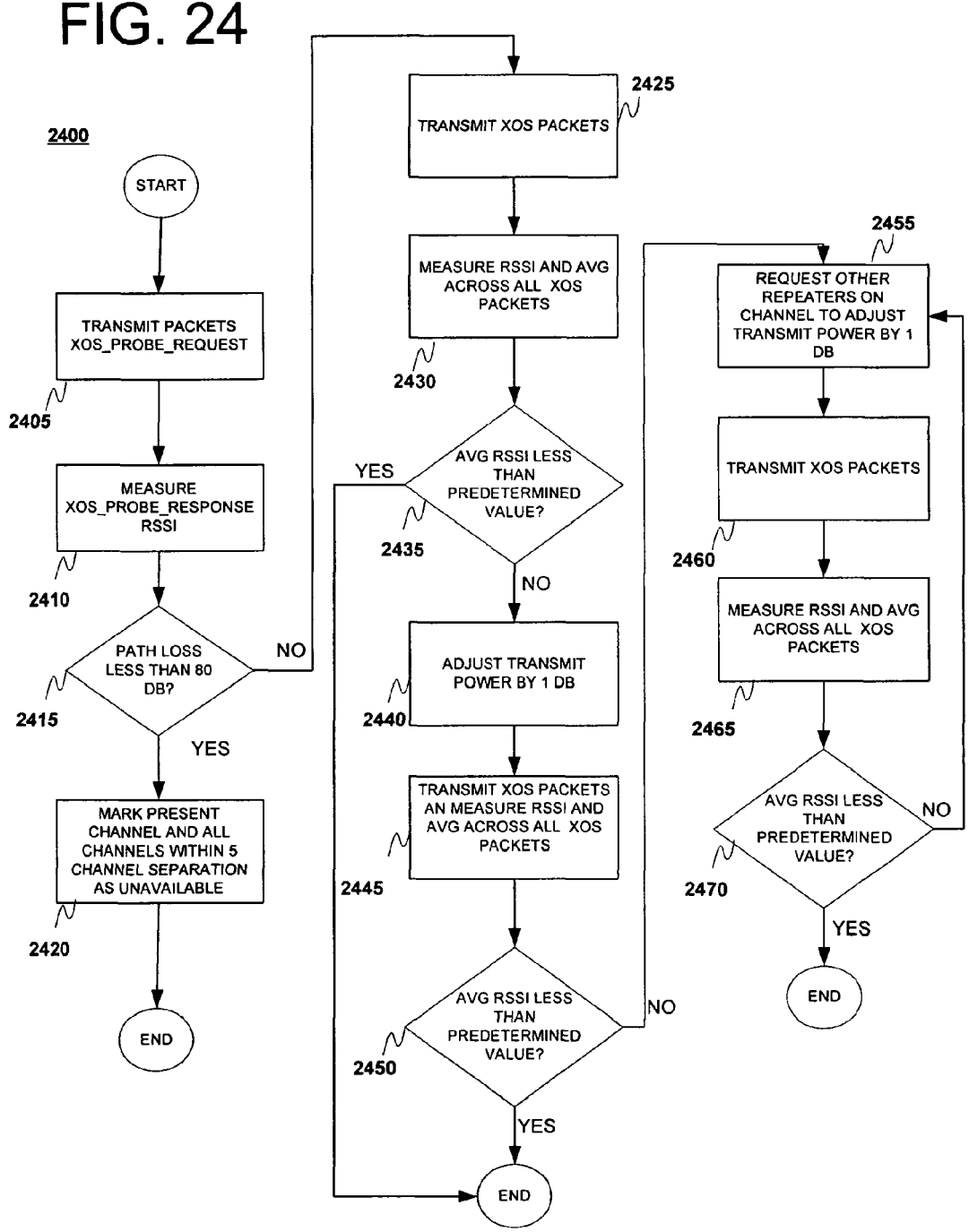
FIG. 24 is a flow diagram illustrating an exemplary power adjustment routine for mitigating oscillation.

Referring to the flow diagram of FIG. 24, the power adjustment routine will be discussed more fully. At 2405, the repeater transmits a predetermined number of XOS_PROBE_REQUEST packets, and at 2410 measures the XOS_PROBE_RESPONSE RSSI. The packets can be generated by, for example, the digital demodulator 1824 under the control of the processor 1825. The XOS_PROBE_REQUEST packet contains the power at which the repeater is transmitting. The difference between the transmit power and measured RSSI is the one-way path loss. At 2415, the repeater determines if this path loss is less than a predetermined value such as, for example, 80 dB. If the path loss is less than 80 dB (YES at 2415), then at 2420 the repeater will mark this channel and all channels within a 5 channel separation as unavailable for use, and the routine ends.

If the path loss is less than 80 dB (NO at 2415), then at 2425 the repeater transmits a number of XOS packets of a maximum length (64 bytes). At 2430, the RSSI from each successfully received packet is measured and averaged across all packets. A packet which has not been successfully received will be considered to have an RSSI of −80 dBm. At 2435, the repeater determines if the average RSSI is less than a predetermined dBm. If the average RSSI is less than the predetermined dBm (YES at 2435), then the routine ends. That is, the discovering repeater will assume that the current transmit power is acceptable and begin normal operation.

If the average RSSI is not less than the predetermined dBm (NO at 2435), then at 2440 the repeater adjusts the transmission power down by 1 dB and at 2445 retransmits the number of XOS packets. At 2450, the repeater determines if the average RSSI is less than the predetermined dBm. If the average RSSI is less than the predetermined dBm (YES at 2450), then the repeater begins normal operation.

If the average RSSI is not less than the predetermined dBm (NO at 2450), then at 2455 the repeater requests that the other repeater(s) on the same channel reduce the transmit power by 1 dB. At 2460 the repeater transmits the number of XOS packets. At 2465, the RSSI from each successfully received packet is measured and averaged across all packets. At 2470, the repeater determines if the average RSSI is less than the predetermined dBm. If the average RSSI is less than the predetermined dBm (YES at 2470), then the repeater begins normal operation.

If the average RSSI is still not less than the predetermined dBm (NO at 2470), then the repeater once again request that the other repeater(s) on its same channel reduce the transmit power by another 1 dB. This will continue with each repeater's power being dropped by 1 dBm, in turn, until the XOS packet test passes. However, if the non-discovering repeater would have to reduce it's transmit power to less than a predetermined amount such as, for example, 9 dB, the discovering repeater will request that the other repeater return to its original transmit power and the discovering repeater can choose a different channel to repeat onto. The current channel and all channels within a 5 channel separation will be marked as unavailable.

While the repeater is operating on the same channels as another repeater, the repeater which was enabled last will enable a monitor that checks for oscillations to occur. When an oscillation is detected, the repeater will perform the same power routine discussed above (2405-2420).

In addition, for every predetermined time period (e.g., 20 seconds) the monitoring repeater will attempt to increase it's transmit power by 1 dB until it has reached it's normal maximum transmit power. Each time the power on either repeater is incremented, an XOS test (2405-2420) will be performed to see if the increase is warranted. It will ratchet each side up in the same manner as the powers were dropped. Once a repeater has been requested to change the transmit power by another repeater, it can monitor the channel for a XOS_OSCMIT_H-EARTBEAT messages from the controlling repeater. If a predetermined time period such as, for example, 20 seconds passes without receiving a heartbeat message from the controlling repeater, the slave unit will assume that the controlling repeater is no longer operating and will revert the power to the normal maximum transmit power for channel spacing configuration.

The above routine can also be applied when more than one other repeater is repeating to the same channels. However, in such as case a monitoring repeater may choose not to increase the power if it has determined within the certain time period (e.g., 10 seconds) that an oscillation would occur by doing so.

Thus, the repeater 1800 according to the third embodiment can execute the power adjustment routine to mitigate oscillation with one or more other receivers on a same channel within a wireless network.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. For example, the repeater may be modified to identify packets previously repeated, and perform an action in response. The action may be to terminate transmission for oscillation mitigation, or to allow repeating depending on the specifics of the detection.

Further, a repeater can incorporate any number of the three embodiments discussed above. That is, the repeater is not limited to only one of the above-discussed embodiments. Further, the circuits discussed above are only exemplary manner for implementing the above described signal modification device. That is, the bi-phase modulation device 1832 and the notch processor 2100 can be implemented in a different manner, as long as a predetermined portion of the signal is modified so that a repeater receiving the modified signal takes an action different from its normal repeating action.

The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention. The various circuits described above can be implemented in discrete circuits or integrated circuits, as desired by implementation. Further, portions of the invention may be implemented in software or the like as will be appreciated by one of skill in the art and can be embodied as methods associated with the content described herein.

The invention claimed is:

1. A first repeater operating within a wireless network, the wireless network including a second repeater capable of communicating with the first repeater, and first and second wireless station devices capable of communicating with at least one of the first repeater and the second repeater, the first repeater comprising:

a reception device for receiving a wireless signal at a reception frequency;

a detector for detecting if a predetermined portion of the received wireless signal includes a modified portion to thereby determine that the received signal is from the second repeater; and a transmission device for transmitting the wireless signal to one of the first and second wireless station devices at a transmission frequency to thereby repeat the wireless signal, wherein the repeater further comprises:

a processor; and a memory coupled to the processor, the memory for storing a power adjustment routine for configuring the processor;

wherein the processor is configured to:

generate probe packets to be transmitted to the second repeater at the transmission frequency;

measure a received signal strength indication (RSSI) of a packet received in response to the probe packets;

determine if a path loss defined by a difference between a power level at which the probe packets were transmitted and the measured RSSI is less than a predetermined value; and mark the transmission frequency as unavailable for use if the path loss is less than the predetermined value.

2. The first repeater of claim 1, wherein the processor is further configured to:

generate a group of packets to be transmitted to the second repeater at the transmission frequency if the path loss is not less than approximately the predetermined value;

determine an average RSSI for the group of packets;

if the average RSSI is less than a predetermined level, mark a current transmission power as acceptable.

3. The first repeater of claim 2, wherein the processor is further configured to:

adjust the current transmission power downward by a predetermined decibel level if the average RSSI is less not than the predetermined level;

regenerate the group of packets to be transmitted to the second repeater at the transmission frequency;

determine an average RSSI for the group of packets; and if the average RSSI is less than a predetermined level, mark a current transmission power as acceptable.

4. A first repeater operating within a wireless network, the wireless network including a second repeater capable of communicating with the first repeater, and first and second wireless stations capable of communicating with at least one of the first repeater and the second repeater, the first repeater comprising:

a reception device receiving a wireless signal from one of the second repeater, first wireless station, and second wireless station;

a detection device coupled to the reception device, the detection device detecting if a received signal strength indication (RSSI) of the wireless signal is greater than a predetermined RSSI threshold;

a digital demodulator coupled to the reception device, the digital demodulator configured to demodulate the wireless signal if the detected RSSI is greater than the predetermined RSSI threshold;

a signal modification device coupled to the reception device, the signal modification device configured to modify a predetermined portion of the wireless signal; and a transmission device coupled to the signal modification device for transmitting the modified wireless signal to one of the second repeater, first wireless station, and second wireless station;

wherein the signal modification device includes a bi-phase modulation device configured to modulate a phase of the predetermined portion of the wireless signal, and wherein the bi-phase modulator includes a transfer switch coupled to a linear oscillator (LO), the transfer switch switching positive and negative terminals of the LO at a predetermined frequency to modulate the phase of the predetermined portion of the wireless signal.

5. A first repeater operating within a wireless network, the wireless network including a second repeater capable of communicating with the first repeater, and first and second wireless stations capable of communicating with at least one of the first repeater and the second repeater, the first repeater comprising:

a reception device receiving a wireless signal including one or more packets at a reception frequency;

a signal modification and detection device coupled to the reception device, the signal modification and detection device configured to modify a predetermined portion of the packet to thereby generate a modified wireless signal and to detect if a predetermined portion of the packet includes a modified signal pattern;

a transmission device coupled to the signal modification and detection device for transmitting the modified wireless signal to one of the second repeater, first wireless station, and second wireless station at a predetermined power level and a transmission frequency;

a processor controlling the reception device and the transmission device; and a memory coupled to the processor, the memory for storing a power adjustment routine for configuring the processor to:

generate probe packets to be transmitted to the second repeater at the transmission frequency;

measure a received signal strength indication (RSSI) of a packet received in response to the probe packets; and adjust one of the power level or the transmission frequency in accordance with the measured RSSI.

6. The first repeater of claim 5, wherein the signal modification and detection device coupled to the reception device comprises a notch processor configured to insert a notch pattern on the wireless signal to be transmitted and detect a notch pattern inserted on a wireless signal received from the second repeater.

7. The first repeater of claim 5, wherein the signal modification and detection device coupled to the reception device comprises:

a bi-phase modulation device configured to modulate a phase of the predetermined portion of the wireless signal; and a digital demodulator coupled to the reception device, the digital demodulator configured to determine if the wireless signal includes a modulated phase pattern as the modified portion.

* * * * *